US008442863B2

(12) United States Patent
Chandramouli et al.

(10) Patent No.: US 8,442,863 B2
(45) Date of Patent: May 14, 2013

(54) REAL-TIME-READY BEHAVIORAL TARGETING IN A LARGE-SCALE ADVERTISEMENT SYSTEM

(75) Inventors: Badrish Chandramouli, Bellevue, WA (US); Jonathan Goldstein, Kirkland, WA (US); Xin Jin, Sammamish, WA (US); Balan Sethu Raman, Redmond, WA (US); Songyun Duan, Hawthorne, NY (US)

(73) Assignee: Microsoft Corporation, Redmond, WA (US)

( * ) Notice: Subject to any disclaimer, the term of this patent is extended or adjusted under 35 U.S.C. 154(b) by 347 days.

(21) Appl. No.: 12/818,100

(22) Filed: Jun. 17, 2010

(65) Prior Publication Data

US 2011/0313844 A1      Dec. 22, 2011

(51) Int. Cl.
  *G06Q 30/00*       (2012.01)
(52) U.S. Cl.
  USPC ......... 705/14.43; 707/725; 707/737; 718/106
(58) Field of Classification Search ............... 705/14.42, 705/14.71, 14.43; 717/115, 139, 141, 151; 707/725, 737; 718/106
  See application file for complete search history.

(56) References Cited

U.S. PATENT DOCUMENTS

| 7,428,555 | B2 * | 9/2008 | Yan ........................................ 1/1 |
| 7,523,123 | B2 * | 4/2009 | Yang et al. ............................. 1/1 |
| 7,756,919 | B1 * | 7/2010 | Dean et al. .................... 709/201 |
| 7,809,740 | B2 * | 10/2010 | Chung et al. ................... 707/758 |
| 8,019,746 | B2 * | 9/2011 | Liu ................................. 707/707 |
| 8,150,723 | B2 * | 4/2012 | Chen et al. .................... 705/7.29 |
| 8,190,610 | B2 * | 5/2012 | Dasdan et al. ................. 707/737 |
| 8,321,873 | B2 * | 11/2012 | Shao ............................. 718/105 |
| 2006/0080394 | A1 * | 4/2006 | Goodman et al. ............. 709/206 |
| 2007/0061195 | A1 | 3/2007 | Liu |
| 2007/0073723 | A1 * | 3/2007 | Ramer et al. .................... 707/10 |
| 2009/0006363 | A1 | 1/2009 | Canny |
| 2009/0300009 | A1 | 12/2009 | Rezaei |
| 2011/0066496 | A1 * | 3/2011 | Zhang et al. ............... 705/14.53 |

OTHER PUBLICATIONS

Condie, et al., MapReduce Online, (CiteSteerX, 2009), available at http://citeseerx.ist.psu.edu/.*

(Continued)

*Primary Examiner* — John Weiss
*Assistant Examiner* — Bennett Sigmond
(74) *Attorney, Agent, or Firm* — Lyon & Harr, LLP; Mark A. Watson

(57) ABSTRACT

A "Real-Time-Ready Analyzer" combines a data stream management system (DSMS) with a map-reduce (M-R) framework to construct a streaming map-reduce framework that is suitable for real-time Behavioral Targeting (BT) (or other temporal queries). The Real-Time-Ready Analyzer allows users to write "dual-intent" temporal analysis queries for BT. These queries are succinct and easy to express, scale well on large-scale offline data, and can also work over real-time data. Further, the Real-Time-Ready Analyzer uses the aforementioned streaming map-reduce framework to provide dual-intent algorithms for end-to-end BT phases. Experiments using real data from an advertisement system show that the Real-Time-Ready Analyzer is very efficient and incurs orders-of-magnitude lower development effort than conventional systems.

20 Claims, 8 Drawing Sheets

OTHER PUBLICATIONS

Abadi, D. J., Y. Ahmad, M. Balazinska, U. çetintemel, M. Cherniack, J.-H. Hwang, W. Lindner, A. Maskey, A. Rasin, E. Ryvkina, N. Tatbul, Y. Xing, S. B. Zdonik, The design of the Borealis stream processing engine, Second Biennial Conf. on Innovative Data Systems Research, CIDR 2005, Jan. 4-7, 2005, pp. 277-289, Asilomar, CA, USA.

Ali, M. H., C. Gerea, B. S. Raman, B. Sezgin, T. Tarnavski, T. Verona, P. Wang, P. Zabback, A. Kirilov, A. Ananthanarayan, M. Lu, A. Raizman, R. Krishnan, R. Schindlauer, T. Grabs, S. Bjeletich, B. Chandramouli, J. Goldstein, S. Bhat, Y. Li, V. Di Nicola, X. Wang, D. Maier, I. Santos, O. Nano, S. Grell, Microsoft CEP server and online behavioral targeting, Proc. of the Very Large Data Base Endowment, Aug. 2009, pp. 1558-1561, vol. 2, No. 2, Lyon, France.

The Apache Software Foundation, Apache Hardoop, Jul. 17, 2009, http://hadoop.apache.org, pp. 1-2.

Babcock, B., S. Babu, M. Datar, R. Motwani, J. Widom, Models and issues in data stream systems, Proc. of the Twenty-first ACM SIGACT-SIGMOD-SIGART Symposium on Principles of Database Sys's, PODS 2002, Jun. 3-5, 2002, pp. 1-16, Madison, Wisconsin, USA.

Barga, R. S., J. Goldstein, M. H. Ali, M. Hong, Consistent streaming through time: A vision for event stream processing, 3rd Biennial Conf. on Innovative Data Systems Research, CIDR 2007, Jan. 7-10, 2007, pp. 363-374, Asilomar, CA, USA.

Cao, H., D. Jiang, J. Pei, Q. He, Z. Liao, E. Chen, H. Li, Context-aware query suggestion by mining click-through and session data, Proc. of the 14th ACM SIGKDD Int'l Conf. on Knowledge Discovery and Data Mining, KDD 2008, Aug. 24-27, 2008, pp. 875-883, Las Vegas, Nevada, USA.

Chaiken, R., B. Jenkins, P.-Å. Larson, B. Ramsey, D. Shakib, S. Weaver, J. Zhou, SCOPE: Easy and efficient parallel processing of massive data sets, Proc. of the Very Large Data Base Endowment, Aug. 24-30, 2008, vol. 1, No. 2, pp. 1265-1276, Auckland, New Zealand.

Chen, Y., D. Pavlov, J. F. Canny, Large-scale behavioral targeting, Proc. of the 15th ACM SIGKDD Int'l Conf. on Knowledge Discovery and Data Mining, KDD 2009, Jun. 28-Jul. 1, 2009, pp. 209-218, Paris, France.

Microsoft Corporation, Content categorization engine, retrieved Apr. 13, 2010, http://adlab.microsoft.com/Content-Categorization/.

Cranor, C. D., T. Johnson, O. Spatscheck, V. Shkapenyuk, Gigascope: A stream database for network applications, Proc. of the 2003 ACM SIGMOD Int'l Conf. on Management of Data, Jun. 9-12, 2003, pp. 647-651, San Diego, California, USA.

Dean, J., S. Ghemawat, MapReduce: Simplified data processing on large clusters, 6th Symposium on Operating Systems Design and Implementation, OSDI 2004, Dec. 5, 2004, pp. 137-149, USENIX Association.

Ganti, V., A. C. König, X. Li, Precomputing search features for fast and accurate query classification, Proc. of the Third Int'l Conf. on Web Search and Web Data Mining, WSDM 2010, Feb. 4-6, 2010, pp. 61-70, New York, NY, USA.

Gates, A., O. Natkovich, S. Chopra, P. Kamath, S. Narayanam, C. Olston, B. Reed, S. Srinivasan, U. Srivastava, Building a high-level dataflow system on top of map-reduce: The pig experience, Proc. of the Very Large Data Base Endowment, Aug. 24-28, 2009, vol. 2, No. 2, pp. 1414-1425, Lyon, France.

Ghemawat, S., H. Gobioff, S.-T. Leung, The Google file system, Proc. of the 19th ACM Symposium on Operating Systems Principles, SOSP 2003, Oct. 19-22, 2003, pp. 29-43, Bolton Landing, NY, USA.

Goldstein, J., M. Ali, R. Barga, M. Hong, Consistency sensitive operators in CEDR, TechReport MSR-TR-2007-158, Dec. 2007.

Goldstein, J., M. Hong, Operator algorithm design for speculative stream processing, TechReport MSR-TR-2007-158, Dec. 2007.

Gupta, S., M. Bilenko, M. Richardson, Catching the drift: Learning broad matches from clickthrough data, Proc. of the 15th ACM SIGKDD Int'l Conf. on Knowledge Discovery and Data Mining, KDD 2009, Jun. 28-Jul. 1, 2009, pp. 1165-1174, Paris, France.

Hu, J., H.-J. Zeng, H. Li, C. Niu, Z. Chen, Demographic prediction based on user's browsing behavior, Proc. of the 16th Int'l Conf. on World Wide Web, WWW 2007, May 8-12, 2007, pp. 151-160, Banff, Alberta, Canada.

Huaiming, S., W. Yang, A. Mingyuan, W. Weiping, S. Ninghui, Query prediction in large scale data intensive event stream analysis systems, Seventh Int'l Conf. on Grid and Cooperative Computing, GCC 2008, Oct. 24-26, 2008, pp. 301-308.

Isard, M., M. Budiu, Y. Yu, A. Birrell, D. Fetterly, Dryad: Distributed data-parallel programs from sequential building blocks, Proc. of the 2007 EuroSys Conf., EuroSys 2007, Mar. 21-23, 2007, pp. 59-72, Lisbon, Portugal.

Jain, N., S. Mishra, A. Srinivasan, J. Gehrke, J. Widom, H. Balakrishnan, U. çetintemel, M. Cherniack, R. Tibbetts, S. B. Zdonik, Towards a streaming SQL standard, Proc. of the Very Large Data Base Endowment, Aug. 24-30, 2008, pp. 1379-1390, vol. 1, No. 2, Auckland, New Zealand.

Jones, R., B. Rey, O. Madani, W. Greiner, Generating query substitutions, Proc. of the 15th Int'l Conf. on World Wide Web, WWW 2006, May 23-26, 2006, pp. 387-396, Edinburgh, Scotland, UK.

Laskov, P., C. Gehl, S. Krüger, K.-R. Müller, Incremental support vector learning: Analysis, implementation and applications, Journal of Machine Learning Research, Sep. 2006, vol. 7, pp. 1909-1936.

Microsoft Corporation, LINQ, Apr. 13, 2010, http://msdn.microsoft.com/en-us/netframework/aa904594.aspx, pp. 1-3.

Netscape, Open Directory Project, Apr. 13, 2010, http://www.dmoz.org/, p. 1.

Nicolas, P., Online audience behavior analysis and targeting, Apr. 13, 2010, http://www.pnexpert.com/Analytics.html, pp. 1-12.

Olston, C., B. Reed, U. Srivastava, R. Kumar, A. Tomkins, Pig latin: A not-so-foreign language for data processing, Proc. of the ACM SIGMOD Int'l Conf. on Management of Data, SIGMOD 2008, Jun. 9-12, 2008, pp. 1099-1110, Vancouver, BC, Canada.

Oracle, Oracle cloud computing forum, Apr. 13, 2010, p. 1.

Sahami, M., T. D. Heilman, A web-based kernel function for measuring the similarity of short text snippets, Proc. of the 15th Int'l Conf. on World Wide Web, WWW 2006, May 23-26, 2006, pp. 377-386, Edinburgh, Scotland, UK.

Salton, G., C. Buckley, Term-weighting approaches in automatic text retrieval, Inf. Process. Manage., Jan. 1988, pp. 513-523, vol. 24, No. 5.

Srivastava, U., J. Widom, Flexible time management in data stream systems, Proc. of the Twenty-third ACM SIGACT-SIGMOND-SIGART Symposium on Principles of Database Sys's, PODS 2004, Jun. 14-16, 2004, pp. 263-274, Paris, France.

Tucker, P. A., D. Maier, T. Sheard, L. Fegaras, Exploiting punctuation semantics in continuous data streams, IEEE Trans. on Knowledge and Data Eng'g, May/Jun. 2003, pp. 555-568, vol. 15, No. 3.

ValueClick, Inc., ValueClick media launches predictive behavioral targeting, Apr. 13, 2010, pp. 1-3.

Web Analytics Association, Premier corporate members, Apr. 13, 2010, http://www.webanalyticsassociation.org/?page=premier_members, pp. 1-6.

Wikipedia, Statistical hypothesis testing, http://en.wikipedia.org/wiki/Statistical_hypothesis_testing, Apr. 13, 2010, pp. 1-8.

Yan, J., N. Liu, G. Wang, W. Zhang, Y. Jiang, Z. Chen, How much can behavioral targeting help online advertising?, Proc. of the 18th Int'l Conf. on World Wide Web, WWW 2009, Apr. 20-24, 2009, pp. 261-270, Madrid, Spain.

Yourkit, LLC, Esper—Complex event processing, Mar. 20, 2010, http://esper.codehaus.org/.

Yu, Y., M. Isard, D. Fetterly, M. Budiu, Ú. Erlingsson, P. K. Gunda, J. Currey, DryadLINQ: A system for general-purpose distributed data-parallel computing using a high-level language, OSDI 2008, Eighth Symposium on Operating System Design and Implementation, Dec. 2008, pp. 1-14.

* cited by examiner

REAL-TIME-READY BEHAVIORAL TARGETING IN A LARGE-SCALE ADVERTISEMENT SYSTEM

BACKGROUND

1. Technical Field

A "Real-Time-Ready Analyzer," as described herein, combines a data stream management system (DSMS) with a map-reduce (M-R) framework to construct a streaming map-reduce framework that is suitable for use in performing temporal queries, such as real-time Behavioral Targeting (BT), on very large data sets.

2. Background

As the Web becomes increasingly ubiquitous, online advertisement delivery platforms are witnessing an increasing volume of users performing activities such as searches and webpage visits. For example, consider the problem of display advertising, where ads need to be selected and shown to users as they browse the Web. Behavioral Targeting (BT) is a relatively new technology, where the system selects the most relevant ads to display to users based on their observed prior behavior such as searches, webpages visited, etc. Briefly, BT builds a behavior profile for each user (also referred to as a UBP or "user behavior profile"), and utilizes these profiles and ad click behavior of previous users to predict the relevance of each ad for a current user who needs to be delivered an ad. A common measure of relevance for BT is click-through-rate (CTR), which represents the fraction of ad impressions that result in a click. Note that BT is different from both content matching, where ads are chosen based on the webpage content, and sponsored search that relies only on the session information (search) to choose ads on search result pages. Many well-known advertising companies use BT as a part of their advertising platform.

In general, conventional advertisement systems collect and store data related to billions of users and hundreds of thousands of ads. For effective BT, multiple steps need to be performed on the data in a scalable manner. These steps include:

Bot Elimination: Advertisement systems generally detect and eliminate bots, which are automated surfers and ad clickers, to eliminate spurious data before further analysis, for more accurate BT.

Data Reduction: The UBPs are sparse and of extremely high dimensionality, with millions of possible keywords and URLs. Thus, it is beneficial to eliminate useless information in a manner that retains and amplifies the most important signals for subsequent operations. Some common data reduction schemes used for BT include: (1) mapping keywords to a smaller set of concepts by feature extraction; and (2) retaining only the most popular attributes by feature selection.

Model Building and Scoring: Advertisement systems work best with accurate models built from the behavior profiles, based on historical information about ad effectiveness. For example, one conventional technique groups similar users using clustering algorithms, while another conventional technique fits a Poisson distribution as a model for the number of clicks and impressions. The models are then used to score active users in real-time, i.e., predict ad relevance in order to choose suitable ads for delivery.

Prior work on BT has focused on algorithms and techniques that scale well for large-scale historical offline data using the well-known "map-reduce" (M-R) framework. However, many BT queries are fundamentally temporal and not easily expressible in the M-R framework. Consequently, the generally high turnaround time for BT can result in missed ad presentation opportunities since such systems are not typically capable of operating and analyzing real-time data feeds directly.

More specifically, existing BT techniques are geared towards offline processing over a map-reduce cluster. For example, current data reduction proposals for UBPs (i.e., user behavior profiles) include: (a) reducing data using popularity-based feature selection, i.e., retaining the most popular keywords; and (b) mapping keywords to a smaller set of categories. Unfortunately, neither of these techniques performs well for detecting important signals in the massive volume of data, or for responding quickly to rapidly changing trends and interests.

Current temporal analysis methodologies for BT and other applications work only on offline data, by writing custom SCOPE/map-reduce scripts that process offline data in a scalable manner on a cluster. These solutions are generally difficult to specify, implement, test, debug, maintain, etc., due to the fundamental temporal nature of the data. Further, these solutions do not directly work on real-time data streams.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In general, a "Real-Time-Ready Analyzer," as described herein, combines a data stream management system (DSMS) with a map-reduce (M-R) framework to construct a streaming map-reduce framework that is suitable for use in performing temporal queries, such as, for example, real-time Behavioral Targeting (BT), on data sets of any size. The Real-Time-Ready Analyzer allows users to write "dual-intent" temporal analysis queries for BT or other temporal queries. These queries are succinct and easy to express, scale well on large-scale offline data, and can also work over real-time data. Note that for purposes of explanation, the remaining discussion of the Real-Time-Ready Analyzer will be described with respect to the use of BT, but that any temporal query can be executed by Real-Time-Ready Analyzer. In particular, BT is simply a popular and relevant example that can be expressed using temporal queries. Further, the Real-Time-Ready Analyzer provides dual-intent streaming map-reduce algorithms for end-to-end BT phases (or other temporal query). Experiments using real data from an advertisement system show that the Real-Time-Ready Analyzer is very efficient and incurs orders-of-magnitude lower development effort than conventional systems. For example, a BT solution constructed with the Real-Time-Ready Analyzer framework uses only about 19 lines of LINQ code, and performs up to several times better than current schemes in terms of memory, learning time, and click-through-rate/coverage.

More specifically, the Real-Time-Ready Analyzer uses the aforementioned streaming map-reduce framework to provide an end-to-end architecture for BT, that is completely data driven and can detect and respond to rapidly varying interests and trends to maximize relevance (CTR). The framework of the Real-Time-Ready Analyzer takes temporal data analysis algorithms (e.g., for BT) expressed in any desired data stream management system (DSMS) language. The framework allows these algorithms to execute over offline data stored in a distributed file system, by using any conventional mapreduce (M-R) framework for partitioning the computation, and a DSMS for performing the temporal analysis on the partitioned data. Advantageously, the same queries can naturally work over real-time data sources.

Further, the Real-Time-Ready Analyzer provides real-time ready streaming map-reduce algorithms for each phase of the new BT architecture described herein. In addition, the Real-Time-Ready Analyzer describes a new technique to estimate CTR for a given user, and a method to utilize this prediction for the purpose of evaluating alternative BT approaches without running a live pilot deployment.

In addition, the problem of delivering relevant ads to end-users based on their historical web-browsing behavior is addressed, with a goal of increasing click-through-rate (CTR) for the delivered ads. User behavior is represented as a user-behavior-profile (UBP) which is a bag-of-words representation of searches performed, pages visited, etc. Specific issues that are addressed in this problem space, called behavioral targeting (BT), include reducing the dimensionality of the input and rapidly responding to variable user interests. More specifically, UBPs are a high-dimensional input, wherein the dimensionality is drastically reduced (by getting rid of unnecessary information, such as information relating to bot behavior, for example) for effective learning, without sacrificing targeting accuracy. Further, user interests are highly variable (e.g., new products like Wii® may be released, new terms like "iCarly", "twitter", etc., may become interesting, user interests may wax and wane rapidly, etc.). The Real-Time-Ready Analyzer provides BT techniques that can handle such changes to maximize ad relevance.

Finally, the analysis/mining techniques for BT (and other applications) enabled by the Real-Time-Ready Analyzer work over large-scale offline data (click logs, search logs, etc.) stored in a distributed file system, and at the same time, these techniques are real-time-ready so that they can work directly over online data streams while detecting and responding to rapidly changing user interests and trends. Consequently, the Real-Time-Ready Analyzer provides BT solutions that are both real-time-ready and future-proof.

In view of the above summary, it is clear that the Real-Time-Ready Analyzer described herein provides various techniques for combining a data stream management system (DSMS) with a map-reduce (M-R) framework to construct a streaming map-reduce framework that is suitable for use in performing temporal queries, such as real-time Behavioral Targeting (BT), on data sets of any size. In addition to the just described benefits, other advantages of the Real-Time-Ready Analyzer will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

Figure 1:
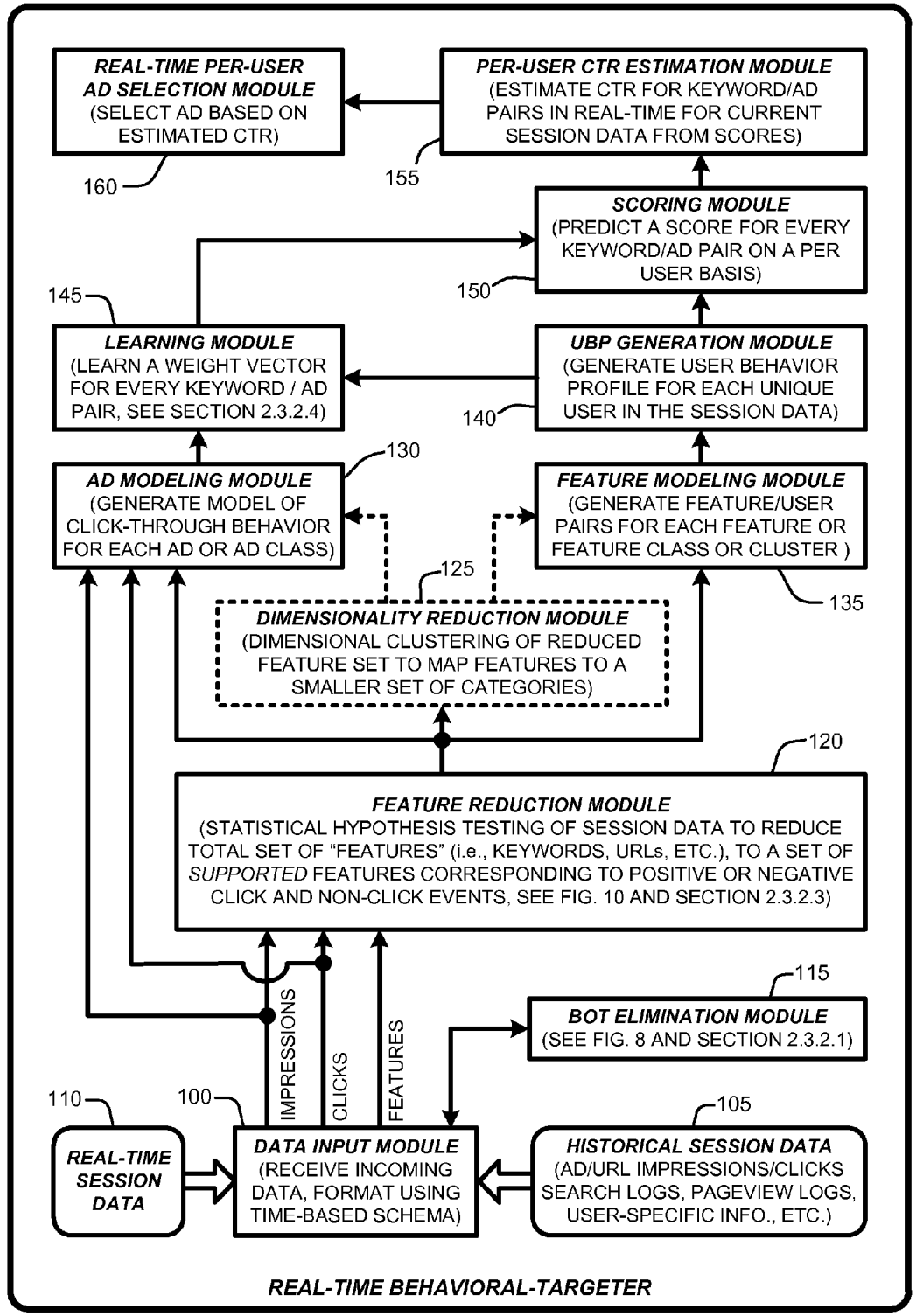
FIG. 1 provides an exemplary architectural flow diagram that illustrates program modules for implementing various embodiments of the Real-Time-Ready Analyzer, as described herein.

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

In general, a "Real-Time-Ready Analyzer," as described herein, combines a data stream management system (DSMS) with a map-reduce (M-R) framework to construct a "streaming map-reduce" framework that is suitable for use in performing temporal queries, such as real-time Behavioral Targeting (BT), on data sets of any size. The Real-Time-Ready Analyzer allows users to write "dual-intent" temporal analysis queries for BT or other temporal queries. These queries are succinct and easy to express, scale well on large-scale offline data, and can also work over real-time data. Note that for purposes of explanation, the remaining discussion of the Real-Time-Ready Analyzer will be described with respect to the use of BT, but that any temporal query can be executed by Real-Time-Ready Analyzer. In particular, BT is simply a popular and relevant example of a data analysis problem that can be expressed using temporal queries. Further, the Real-Time-Ready Analyzer provides dual-intent streaming map-reduce algorithms for end-to-end BT phases (or other temporal query). Experiments using real data from an advertisement system show that the Real-Time-Ready Analyzer is very efficient and incurs orders-of-magnitude lower development effort than conventional systems.

Note that for purposes of explanation, the following detailed description of the Real-Time-Ready Analyzer make refers to Microsoft® StreamInsight and Microsoft® Dryad as running examples of DSMS and map-reduce applications, respectively. However, it should be understood that the concepts described herein are directly applicable to other DSMS and map-reduce products and techniques.

Note also that the term "keyword", as used herein is intended to refer to both search terms and pageviews (i.e., URLs visited) recorded or captured during each users' browsing session or sessions, and that the term "feature" is used to refer to observed user behavior indicators such as search terms or keywords, URLs visited, etc. Consequently, for simplicity, the terms "feature" and "keyword" are used interchangeably throughout the following discussion to refer to these various elements.

1.1 Challenges:

Recent work has experimentally shown the value of BT in the online advertising market. As is known to those skilled in the art, in order to scale BT to the large volume of users and ads, historical user data is stored in a distributed file system such as HDFS, GFS, or Cosmos. Note that this data is fundamentally temporal in nature, where each action (e.g., ad click) is associated with a timestamp. In order to analyze this data, systems typically use map-reduce (M-R) computations on a cluster that allow the same computation to be executed in parallel on different data partitions.

1.1.1 Scalability with Easy Specification:

For purposes of explanation, consider the following very simple BT-style analysis query:

Example 1

A data analyst wishes to report how the number of clicks (or average CTR) for each ad in a 6-hour window, varied over a 30-day dataset. This query, i.e., "RunningClickCount," may be used to determine periodic trends and correlations with other data. This query is fundamentally temporal in nature. Front-end languages such as Pig, SCOPE, and DryadLinq are frequently used to make it easy to write analysis queries. However, as discussed in Section 2.2, queries such as RunningClickCount involve non-trivial temporal sequence computations that are difficult to capture using traditional database-style set-oriented languages (in fact, it can be seen that a SCOPE query for RunningClickCount is intractable). While it is possible to write customized map-reduce code from scratch, such customized algorithms are more complex, harder to debug, and not easily reusable (the simple RunningClickCount example requires around 60 lines of code).

A more common example is BT, where the analysis is fundamentally temporal, e.g., whenever a user clicks or rejects an ad, it is desireable to access the last several hours of their behavior data as of that time instant. This is useful for detecting subtle behavior correlations for BT. For example, consider the following example of BT based on keyword trends:

Example 2

A new television series ("iCarly") targeted towards the teen demographic is aired, resulting in a spike in searches for that show. Interestingly, in evaluating a working embodiment of the Real-Time-Ready Analyzer using a large set of real-world data, it was observed that searches for the show were strongly correlated with clicks on a deodorant ad. Other keywords observed to be positively correlated with this ad included "celebrity", "exam", "chat", "music", etc. In contrast, keywords such as "jobless", "credit", and "construction" were negatively correlated with clicks on the same ad. Given the complexity of temporal analysis in BT, it is beneficial to have a mechanism whereby analysts can express time-based computations easily and succinctly, while at the same time allowing scalable processing on a cluster. Such a mechanism can enable quick building, debugging, and deployment of new BT schemes.

1.1.2 Real-Time-Readiness:

As commercial systems mature, it is likely that they will operate directly on incoming real-time data feeds instead of offline computations on stored data. For example, it may be desired to re-use a query such as RunningClickCount to operate over real-time click feeds and produce a dashboard-style real-time tracker. In the case of BT, the inability to operate directly on real-time streaming data introduces a delay before new behavior can be detected and used to target users. This can result in missed opportunities. For instance, in Example 1 (see above), it would be useful for BT to immediately and automatically detect such a behavior trend correlating searches for "iCarly" with deodorant ads, and thus deliver deodorant ads to such users in order to maximize CTR.

Current schemes based on map-reduce suggest waiting for the data to be collected and loaded into the distributed file system. Then, a sequence of offline analysis algorithms execute and produce a new model, which is finally deployed to score users. There is typically a significant delay between trends occurring and being reflected in scoring, which results in such dynamic behavior variations and correlations remaining unexploited. Current BT solutions cannot easily be reused for live data since they do not possess the required efficient real-time data input, output, and processing capabilities.

Another alternative is to deploy a data stream management system (DSMS) for real-time event processing, but a DSMS cannot by itself handle map-reduce-based offline data processing that is dominant in conventional commercial systems. Implementing a custom distributed infrastructure to process large-scale offline data using a DSMS is difficult since issues such as locality-based data partitioning, efficient re-partitioning, network-level transfer protocols, handling machine failures, system administration, etc., which map-reduce clusters already solve transparently, need to be specially handled.

If new BT techniques are designed only for real-time, it incurs effort in maintaining two disparate systems for a migration to real-time implementation. Further, it is not possible to first debug, test, and deploy streaming queries over large-scale offline data using the current map-reduce infrastructure, before switching to real-time deployment.

In summary, there is a need for a new framework to enable the development and testing of BT techniques that scale well for offline data, and can also be used over real-time data without significant re-work when the system is ready to migrate to real-time. This needed framework is provided by the Real-Time-Ready Analyzer, as described in detail herein.

1.1.3 Developing Dual-Intent BT Algorithms:

Assume the existence of a new framework that does enable the development and testing of BT techniques that scale well for offline data, and can also be used over real-time data without significant re-work when the system is ready to migrate to real-time. Unfortunately, existing BT proposals are intimately tied to the map-reduce offline computation model, and it is not clear how these techniques can be adapted to work directly over real-time data feeds. Thus, there is a need to rethink BT algorithms for each BT stage (bot elimination, data reduction, model building, etc.) so that they are dual-intent, i.e., they serve two intentions of not only working well over offline data, but also easily adaptable to operate over real-time data for maximum responsiveness while exploiting current user trends.

1.2 Feature Overview:

As noted above, and as described in further detail in Section 2, the Real-Time-Ready Analyzer provides a novel framework that combines a DSMS with a map-reduce-style distributed computing platform. The Real-Time-Ready Analyzer allows users to write analysis queries that can run efficiently on large-scale temporal data stored in a cluster, and can directly be migrated to work over real-time high-event-rate data streams.

More specifically, the Real-Time-Ready Analyzer provides an end-to-end BT solution, with scalable and real-time-ready dual-intent algorithms for bot elimination, data reduction, and model building. Of particular interest is a novel dual-intent algorithm for data reduction that uses statistical hypothesis testing for detecting and exploiting trends such as those depicted above in Example 1.

The Real-Time-Ready Analyzer enables quick coding and testing (on large-scale offline data) using the BT approach described herein. For example, in a tested embodiment, the Real-Time-Ready Analyzer used only about 19 lines of LINQ code to implement BT queries end-to-end. Further, the Real-Time-Ready Analyzer is highly scalable and efficient, incurs orders-of-magnitude lower development cost, and provides real-time-readiness with observed event rates on the order of about 12K events/sec per machine (depending upon the computational capabilities of the machine). Further, the dual-intent real-time-ready BT algorithms provided by the Real-Time-Ready Analyzer are effective at reducing memory usage and learning time by up to an order-of-magnitude, while delivering better CTR (by up to several factors) and coverage than current BT schemes.

1.3 System Overview:

As noted above, the "Real-Time-Ready Analyzer," provides various techniques for combining a data stream management system (DSMS) with a map-reduce (M-R) framework to construct a streaming map-reduce framework that is suitable for real-time Behavioral Targeting (BT). The processes summarized above are illustrated by the general system diagram of FIG. 1. In particular, the system diagram of FIG. 1 illustrates the interrelationships between program modules for implementing various embodiments of the Real-Time-Ready Analyzer, as described herein. Furthermore, while the system diagram of FIG. 1 illustrates a high-level view of various embodiments of the Real-Time-Ready Analyzer, FIG. 1 is not intended to provide an exhaustive or complete illustration of every possible embodiment of the Real-Time-Ready Analyzer as described throughout this document.

In addition, it should be noted that any boxes and interconnections between boxes that may be represented by broken or dashed lines in FIG. 1 represent alternate embodiments of the Real-Time-Ready Analyzer described herein, and that any or all of these alternate embodiments, as described below, may be used in combination with other alternate embodiments that are described throughout this document.

In general, as illustrated by FIG. 1, the processes enabled by the Real-Time-Ready Analyzer begin operation by using a data input module 100 to receive historical session data 105. This historical session data 105 data typically consists of terabytes of logs, including ad impressions, ad clicks, search/pageview logs, other URL or user specific data, etc., for very large groups of users. The data input module 100 then formats each entry of this log data into a time-based schema such as, for example, Time-StreamID-UserID-KwAdID, as discussed in further detail in Section 2.2.1. In general, this schema provides, for each entry in the incoming data, a time stamp, an indication of whether or not a click was involved, a particular user involved, and the keyword, ad, or URL (i.e., the "feature") involved in the particular entry.

Note also, that following initial training of the Real-Time-Ready Analyzer, as described in further detail below, the data input module 100 receives and formats real-time session data 110 from users for use in presenting those users with specific ads or other relevant URLs. In general, the real-time session data 110 is handled in the same way as the historical session data 105. The only difference is that the historical session data is typically a much larger data set that is used for learning user behavioral profiles (UBPs) an other model parameters relating to particular ads, features, etc., while the real-time session data 110 is used to update that learned information and to return specific ads or other relevant URLs to corresponding users in real-time.

In any case, once the incoming session data (105 or 110) has been formatted in the appropriate schema, that session data is presented to a bot elimination module 115 that processes the data to detect and eliminate session data generated by bots rather than real users. As is well known to those skilled in the art, a "bot" is an automated surfer and ad clicker that can overwhelm and skew the overall session data since there can be very large numbers of bots having very large numbers of clicks and impressions. Consequently, detection and elimination of session data generated by bots makes the remaining session data significantly more relevant for use in generating models that can be used to accurately serve ads and/or URLs to real users in real time. Note that bot elimination is discussed in further detail in Section 2.3.2.1.

Once bot-related data has been eliminated from the incoming session data, the remaining time-stamped impressions, clicks, and feature information are provided to a feature reduction module 120. In general, as discussed in further detail in Section 2.3.2.3 with respect to FIG. 10, feature reduction is accomplished by using various statistical techniques to reduce the total set of "features" (i.e., keywords, URLs, etc.) to a set of relevant features corresponding to positive or negative click and non-click events. Note also, that this feature reduction process also considers whether the ads or URLs have sufficient "support" (e.g., minimum of 5 clicks each). In other words, ads and/or URLs that have at least 5 clicks (or other desired level of "support") in the session data (following bot removal) are statistically correlated or associated with features that represent either positive or negative click events. For example, if it is determined that when users search on a particular keyword, those users do not click on a particular ad (which has sufficient support based on total number of clicks), then that keyword has a negative correlation to that ad. Conversely, if it is determined that when users search on a particular keyword, some of those users will click on a particular ad (which has sufficient support based on total number of clicks), then that keyword has a positive correlation to that ad.

In various embodiments, the reduced feature set (with positive and negative correlations to ads and/or URLs) produced by the feature reduction module 120 is then provided to a dimensionality reduction module 125. In general, the dimensionality reduction module 125 further reduces the total number of features by mapping those features to a smaller set of concepts. In other words, the reduced set of keywords generated via support-based statistical hypothesis testing (see element 120 of FIG. 1) is used as an input to a dimensionality reduction process that applies an optional real-time clustering process to the reduced feature set. The resulting features clusters are then treated as individual "features" for purposes of further evaluation.

Next, the Real-Time-Ready Analyzer provides the reduced feature set (output from element 120 or element 125 of FIG. 1) in combination with the bot-free data derived from the incoming session data (105 and/or 110) to an ad modeling module 130. In general, the ad modeling module 130 evaluates impressions and clicks from the bot-free data session in combination with the reduced set of features to produce ad/feature pairs and corresponding observations drawn from the session data. This information is then passed to a learning module 145 along with user behavior profiles (UBPs) that are generated by a UBP module 140 based on feature/user pairs that are generated by a feature modeling module 135 from the reduced feature set (output via element 120 or 125). The combination of the ad/feature pairs and corresponding observations along with the UBPs are used by the learning module 140 to learn or predict a weight vector for each for every keyword/ad pair (see Section 2.3.2.4).

A scoring module 150 then receives the output of the learning module 145 in combination with the UPBs, and predicts a score for every for every keyword/ad pair on a per-user basis, as discussed in Section 2.3.2.4. Next, a per-user CTR estimation module 155 estimates the click-through rate (CTR) for keyword/ad pairs in real-time for current session data on a per-user basis. More specifically, the per-user CTR estimation module 155 estimates the CTR from the predicted scores received from the scoring module 150 by choosing some number k of the nearest validation examples with predictions closest to current prediction, then estimates the CTR for that prediction as the average CTR within the selected k examples. Note that CTR for each keyword/ad pair is a known quantity extracted from the session data (i.e., impressions and clicks), as discussed above. See Section 2.3.2.4 for additional discussion on CTR estimation.

Finally, the Real-Time-Ready Analyzer uses the estimated CTR to select one or more ads to present to the user via a real-time per-user ad selection module 160 that selects appropriate ads to serve to users based on real-time session data 110 that, as discussed above, includes keywords drawn from the user's current session.

2.0 Operational Details of the Real-Time-Ready Analyzer:

The above-described program modules are employed for implementing various embodiments of the Real-Time-Ready Analyzer. As summarized above, the Real-Time-Ready Analyzer provides various techniques for combining a data stream management system (DSMS) with a map-reduce (M-R) framework to construct a streaming map-reduce framework that is suitable for real-time Behavioral Targeting (BT). The following sections provide a detailed discussion of the operation of various embodiments of the Real-Time-Ready Analyzer, and of exemplary methods for implementing the program modules described in Section 1 with respect to FIG. 1. In particular, the following sections provides examples and operational details of various embodiments of the Real-Time-Ready Analyzer, including: a preliminary discussion of various definitions, elements, and considerations of the Real-Time-Ready Analyzer; the general framework of the Real-Time-Ready Analyzer; and implementing BT Algorithms within the framework of the Real-Time-Ready Analyzer.

2.1 Preliminary Discussion:

As noted above, the Real-Time-Ready Analyzer-based processes described herein provide various techniques for combining a data stream management system (DSMS) with a map-reduce (M-R) framework to construct a streaming map-reduce framework that is suitable for real-time Behavioral Targeting (BT). The following paragraphs provide an introduction and discussion of various definitions, elements, and considerations that are used in the detail description of the Real-Time-Ready Analyzer.

2.1.1 Data Stream Management Systems:

As is well known to those skilled in the art, a Data Stream Management System (DSMS) is a system that enables applications to issue long-running continuous queries (CQs) that monitor and process streams of data in real time. DSMSs are used for highly efficient (e.g., thousands of events per second) real-time data processing in a broad range of applications including fraud detection, monitoring RFID readings from sensors (e.g., for manufacturing and inventory control), and algorithmic trading of stocks. For purposes of explanation, the following sub-Sections summarize various DSMS features and capabilities that are generally well known to those skilled in the art.

2.1.1.1 Streams and Events:

A stream is a potentially unbounded sequence $e_1, e_2, \ldots$ of events. An event $e_i = \langle p, c \rangle$ is a notification from the outside world (e.g., sensor) that consists of: (1) a payload=$\langle p_1, \ldots p_k \rangle$, and (2) a control parameter c that provides metadata about the event.

As is well known to those skilled in the art, while the exact nature of the control parameter associated with events varies across systems, two common notions are: (1) an event generation time, and (2) a time window, which indicates the period of time over which an event can influence output. These are captured by defining $c = \langle LE, RE \rangle$, where the time interval [LE, RE) specifies the period (or lifetime) over which the event contributes to output. The left endpoint (LE) of this interval is the application time of event generation, also called the event timestamp. Assuming a window of width w time units, the right endpoint of an event is simply RE=LE+w. For events with no lifetime, RE is set to LE+$\delta$ where $\delta$ is the smallest possible time-unit. We refer to such events as point events.

Figure 2:
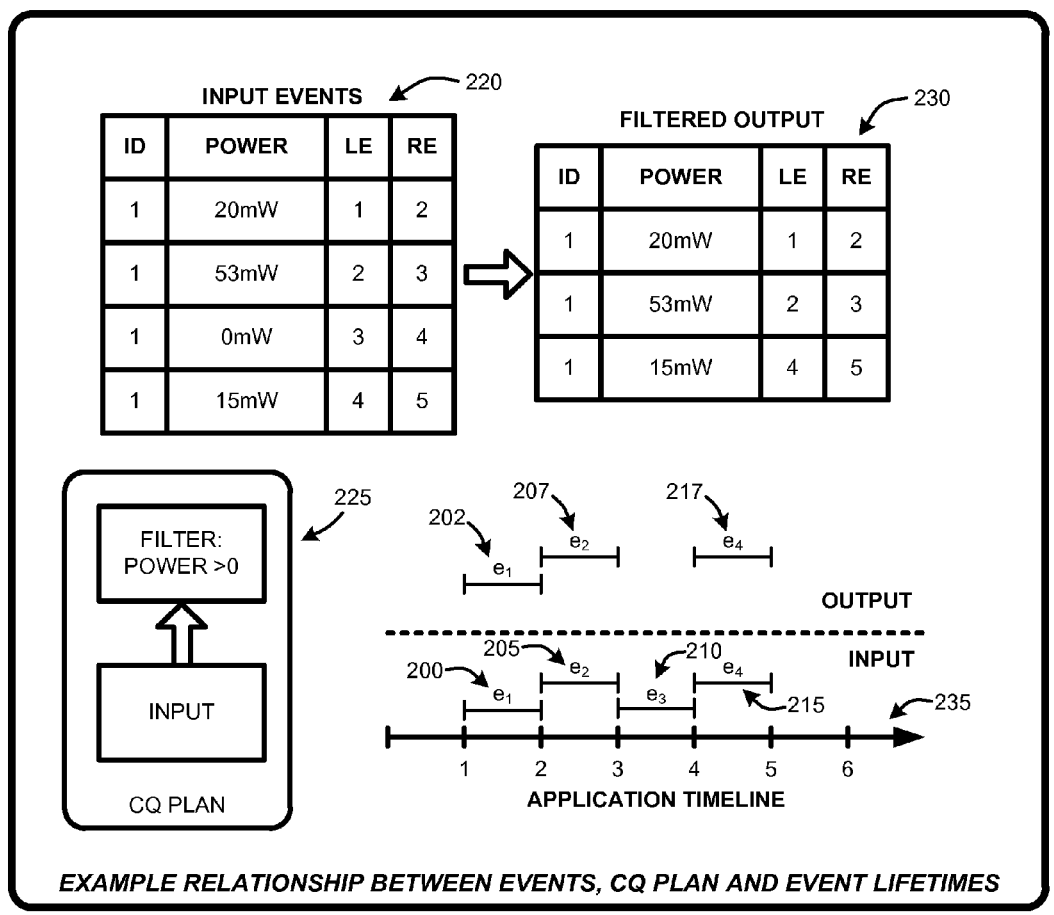
FIG. 2 illustrates a simple example of the relationship between events, a continuous query (CQ) plan associated with those events, and event lifetimes, as described herein.

FIG. 2 illustrates a very simple example of the relationship between events, a CQ plan associated with those events, and event lifetimes. More specifically, FIG. 2 shows four events, $e_1, \ldots, e_4$ (elements 200, 205, 210, and 215) corresponding to four readings (i.e., input events 220) from a power meter with ID=1. The corresponding "temporal relation" depicting events with lifetimes is also shown. In particular, since CQ plan 225 passes all input events having a power reading greater than 0 to the output, as shown, the filtered output 230 will include only filtered events $e_1, e_2, e_4$ (elements 202, 207, and 217), as illustrated since $e_3$ (having a reading of 0 mW) will not pass the filter of CQ plan 225. Note that all events are illustrated in the aforementioned [LE, RE) format, such that event $e_2$ 205, for example, has LE=2 and RE=3, as shown on the application timeline 235 (i.e., lifetime for $e_2$ is [2, 3)).

2.1.1.2 Queries and Operators:

A CQ consists of a tree of operators, each of which performs some transformation on its input streams and produces an output stream. For purposes of explanation, the following paragraphs briefly summarize some of the relevant operators below; further details on operators and related issues such as detecting time progress and state cleanup using punctuations can be found in numerous conventional references.

Filter. A "Filter" is a stateless operator that selects events which satisfy certain specified conditions. For instance, the CQ plan 225 in FIG. 2 provides a filter that detects non-zero power readings (the output events and relation are also shown, as discussed above).

Figure 3:
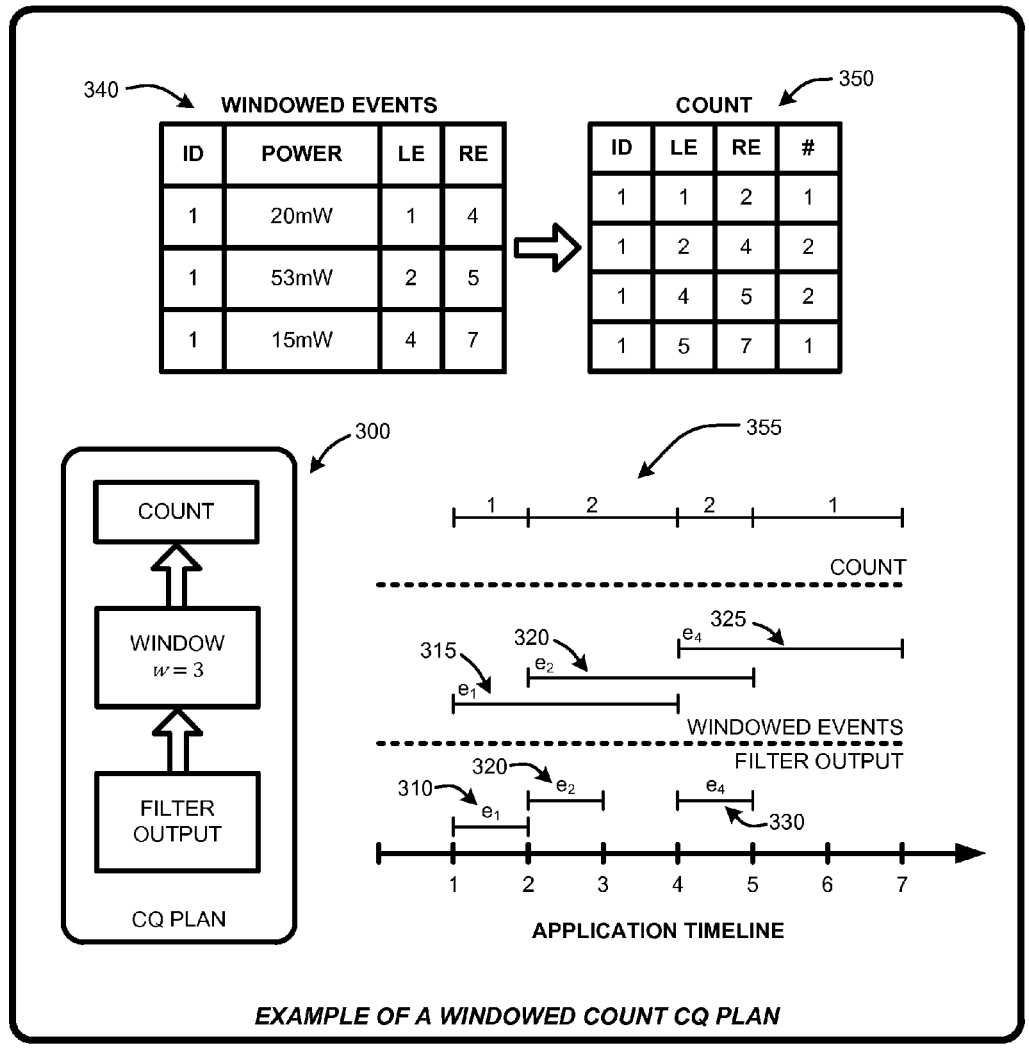
FIG. 3 illustrates a simple example of a windowed Count CQ plan, as described herein.

Continuing the Filter example, suppose it is desired to continuously report the number of non-zero readings in the last 3 seconds. Then, the system would set w=3 and h=0, and use a "Count" operator, which outputs a count at each point along the time axis where the active event set changes (note that operators such as "Sum", "Max", etc. also operate similarly). The CQ plan and events for an example of this scenario are illustrated in FIG. 3. In particular, the CQ 300 plan in this case takes the filtered output of the power readings (elements 310, 320 and 330), windows those events with w=3, to produce windowed events 340, also shown in the timeline as elements 315, 320, and 325. Next, the CQ plan 300 performs a Count 350 of the windowed events, also shown in the timeline as element 355. Note that as illustrated by FIG. 3, the final output reports precisely the count over the last 3 seconds, reported whenever the count changes. For example, the count sequence of 1, 2, 2, 1 is reported as follows: count of 1 at time 1, count of 2 at time 2, and count of 1 at time 5. Note that the count remains at 2 from time 2 through time 5, at which point the count changes to 1 in this example. Consequently, there is no report of the count at time 4.

Windowing and Aggregation: A "Window" operator adjusts event lifetimes to control the time range over which any event contributes to query computation. For window size w, this operator simply sets RE=LE+w. This ensures that at any time t, the set of "active" events, i.e., those events whose lifetimes contain t, includes all events with timestamp in the interval (t−w, t]. In addition, Window may specify a hop size h to indicate that output is desired every h time units (instead of instantly). It is implemented by snapping event LE to the closest multiple of h, thus controlling when the set of active events (and hence query result) can change. A more general "AlterLifetime" operator can directly adjust both LE and RE. Note that both hop size and window size can be set to any desired values. However, in various tested embodiments of the Real-Time-Ready Analyzer, a hop size of h=15 minutes and a window size of w=6 hours were observed to provide good BT results over a broad range of user profiles.

Figure 4:
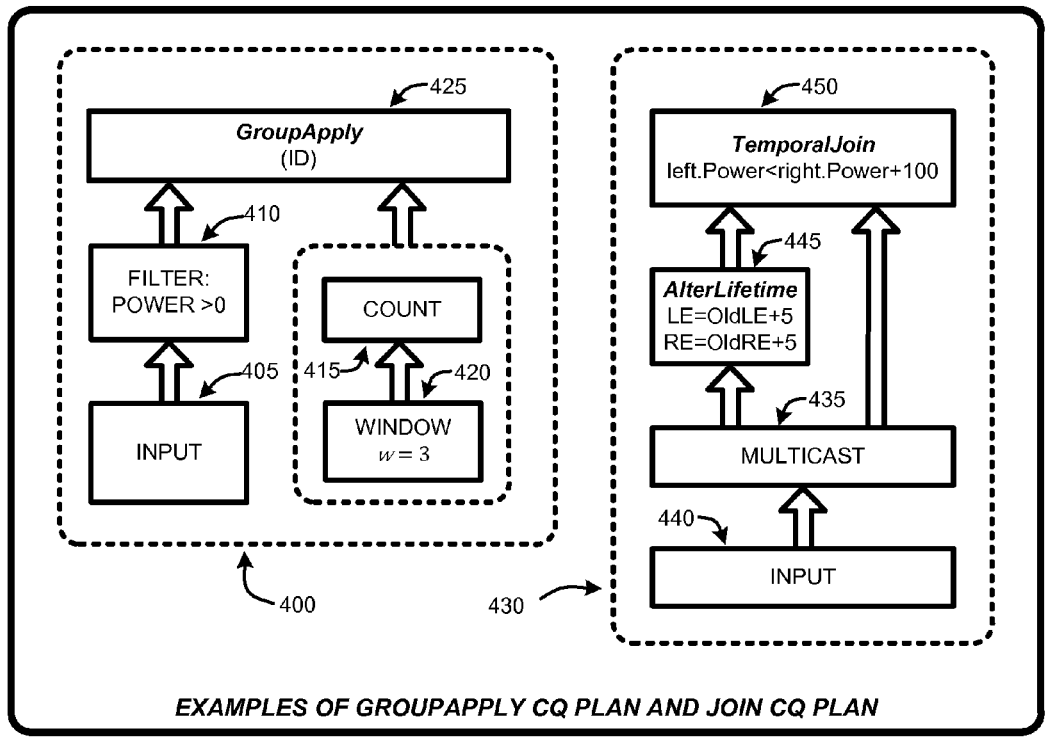
FIG. 4 illustrates a simple example of a GroupApply CQ plan and a TemporalJoin CQ plan, as described herein.

GroupApply, Union, Multicast: The "GroupApply" operator enables specifying a grouping key, and a query sub-plan to be "applied" to each group. Assume there are multiple meters, and it that it is desired to perform the same windowing count for each meter (grouped by ID). For example, CQ plan 400 of FIG. 4 can be used to perform this computation since as with the CQ plan 225 illustrated in FIG. 2, the CQ plan 400 of FIG. 4 receives an input 405 (i.e., meter readings), and applies Filter 410 to that input. In addition, as with the CQ plan of FIG. 3, a running Count 415 is kept for the Window of size w=3. Finally, a GroupApply 425 operator applies the CQ sub-plans (i.e., elements 405 through 420) to each group of unique IDs. A related operator, "Union" (not illustrated), simply merges two streams together, while a "Multicast" operator, illustrated as element 435 in the CQ plan 430 of FIG. 4 is used to send one input stream to two downstream operators, as discussed in further detail below.

TemporalJoin and AntiSemiJoin: The "TemporalJoin" operator allows correlation between two streams, as illustrated by FIG. 4. It outputs the relational join (with a matching condition) of events along its two inputs, called left and right. The output lifetime is the intersection of the contributing event lifetimes. Join is stateful; the active events for each input are stored in a separate internal join synopsis. For example, the CQ plan 430 in FIG. 4 computes time periods when the meter reading increased by 100 mW or more, compared to 5 seconds back. This is accomplished by providing an Input 440 to the Multicast 435 operator, which then splits that Input and provides it to an "AlterLifetime" 445 operator that acts to shift the input stream by a time period of 5 seconds in this example, and to a TemporalJoin 450 operator that correlates the two streams (i.e., the original input stream and the time shifted input stream) to determine when the meter reading increased by 100 mW or more, compared to 5 seconds back.

A common application of TemporalJoin is when the left input consists of point events. In this case, TemporalJoin effectively filters out events on the left input that do not intersect any previous matching event lifetime in the right input synopsis. A related operator, "AntiSemiJoin", is used to eliminate point events from the left input that do intersect some event in the right synopsis.

User-Defined Operators: DSMSes also support incremental user-defined operators (UDOs), where the user provides code to perform computations over the input stream. For example, using a Window (h=15 minutes and w=6 hours) followed by the UDO, the UDO is invoked to perform its user-defined computation every 15 minutes, over events with timestamp in the last 6 hours.

2.1.1.3 User Programmability:

Users often write CQs using languages like StreamSQL, Esper, etc. StreamInsight uses LINQ for writing CQs. Below, an example of how the GroupApply 400 query of FIG. 4 is written in LINQ is provided:

```
var groupedReadingCount =
    from e in inputStream
    where e.Power > 0 // select non-zero readings
    group e by e.ID into group // group by meter ID
    from w in group.SlidingWindow(TimeSpan.FromSeconds(3))
    select new Output { ID=group.Key, Count=w.Count( ) };
```

2.1.2 The Map-Reduce Computing Paradigm:

As is well known to those skilled in the art, there has been a recent surge in interest towards scalable computing over large clusters, for analyzing massive offline datasets. Since parallel database solutions do not scale well for such applications, many systems have embraced distributed storage and processing on large clusters of shared-nothing machines over a high-bandwidth interconnect. Example processes include conventional MapReduce/SawZall schemes, the Dryad/DryadLinq scehmes, and Hadoop based schemes, where each query specifies computations on data stored in a distributed file system such as HDFS, GFS, Cosmos, etc.

Briefly, execution in these systems consists of one or more stages, where each stage has two phases. The map phase defines the partitioning key (or function) to indicate how the data should be partitioned in the cluster, e.g., based on the UserId column. The reduce phase then performs the same computation (aggregation) on each data partition in parallel. The computation is specified by the user, via a reducer method that accepts all rows belonging the same partition, and returns result rows after performing the computation.

Under the basic model, users specify the partitioning key and the reducer method. Recently, several higher-level scripting languages such as SCOPE and Pig have emerged. Such scripting languages offer easier relational- and procedural-style constructs that are finally compiled down to multiple stages of the basic map-reduce computation.

Figure 5:
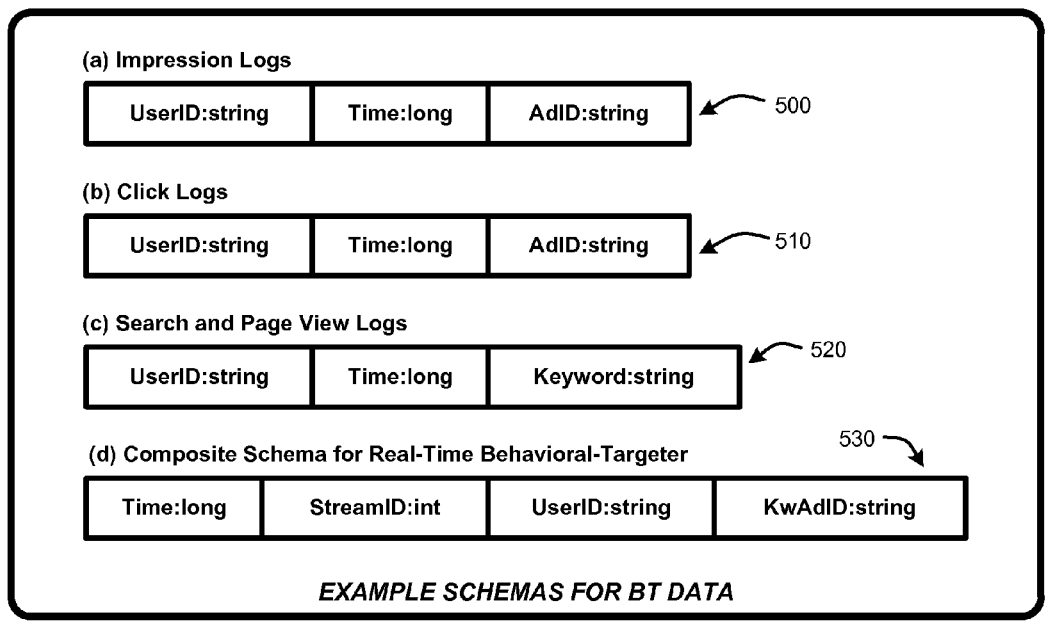
FIG. 5 provides an example of various schemas used for encoding behavioral-targeting (BT) data, as described herein.

2.2 Real-Time-Ready Analyzer Framework:

The input data for BT typically consists of terabytes of logs including ad impressions, ad clicks, search/pageview logs, other URL or user specific data, etc., for very large groups of users (i.e., the "historical session data" 105 illustrated in FIG. 1). Examples of schemas for such logs are shown in FIG. 5, discussed in further detail below. A crucial common aspect is that the data is fundamentally temporal (i.e., related closely to time). For instance, each click is associated with the timestamp of the click. Further, it has been observed that many common analysis queries over this data are themselves fundamentally temporal, requiring the ability to perform time-ordered sequential processing over the data.

Strawman Solutions: Referring back to Example 1 above, (i.e., "RunningClickCount"), as discussed in Section 1.2.1, there are a variety of conventional current solutions for this problem, with the following two strawman solutions providing examples of conventional techniques for addressing this problem:

First, one strawman solution is that the RunningClickCount problem can be expressed using SCOPE, Pig, DryadLinq, etc. For instance, the following SCOPE queries (note that the syntax is similar to SQL) together logically produce the desired output:

```
OUT1 = SELECT a.Time, a.AdId, b.Time as joiningTime
FROM ClickLog AS a INNER JOIN ClickLog AS b
WHERE a.AdId=b.AdId AND b.Time > a.Time - 6 hours;
OUT2 = SELECT Time, AdId, COUNT(joiningTime)
FROM OUT1 GROUP BY Time, AdId;
```

Unfortunately, this query is intractable because it performs a self equi-join of all rows with the same AdId, which is prohibitively expensive from a computational standpoint. The problem is that the relational-style model is unsuitable for sequence-based processing, and trying to force its usage can result in inefficient (and sometimes intractable) map-reduce plans.

A more practical alternative strawman solution to the RunningClickCount problem of Section 1.2.1 is to map (partition) the dataset and write custom reducers that maintain the in-memory data structures to process the temporal query. In the case of RunningClickCount, partitioning is accomplished by AdId, and a reducer is written to process all clicks for each AdId in sorted sequence (by Time). The reducer maintains all clicks and their timestamps in the 6-hour window of this example in a linked list. When a new row is processed, the list is looked up, expired rows are deleted, and the refreshed count is provided as an output. However, although this second strawman solution is more practical than the first strawman solution described above, it still has several disadvantages: (1) it can be inefficient if not implemented carefully; (2) it is non-trivial to code, debug, and maintain, requiring about 60 lines for the simple RunningClickCount example; (3) it cannot handle disordered data without more complex data structures (e.g., red-black trees), and hence, it requires pre-sorting if data can arrive disordered; and (4) it is not easily reusable for other temporal queries.

More crucially, neither of the above-described strawman solutions can be reused easily to directly operate over real-time incoming data. However, the real-time solution described below is capable of such reuse, and offers other advantages as can be seen from the following discussion.

2.2.1 Real-Time Solution Overview:

The Real-Time-Ready Analyzer provides a framework that transparently combines a map-reduce (M-R) system with a DSMS. Users express their temporal analysis queries using a DSMS query language. Streaming queries are declarative and easy to write/debug, often several orders of magnitude smaller than equivalent custom code. The query works naturally on a (scaled-out) DSMS with real-time data, while the framework of the Real-Time-Ready Analyzer allows the same query to also transparently scale on offline data over a cluster by leveraging existing M-R infrastructure.

The Real-Time-Ready Analyzer queries benefit from an efficient DSMS sequence processing engine which also handles disordered input. Thus, there is no need to build customized data structures and algorithms for temporal queries. Since The Real-Time-Ready Analyzer queries can be reused for both offline and live data, a dual development cost is avoided, making solutions developed using this framework both real-time-ready and future-proof.

The Data Model: Streaming queries can accept multiple stream sources as inputs, but most M-R implementations assume the partitioning of a single dataset with a common schema (i.e., the reducer accepts only a single input of rows). This disconnect is bridged by storing (or pre-processing) data in the distributed file system using a unified schema such as schema 530 shown in FIG. 5. Here, "Time" refers to the timestamp of activity occurrence. Note that the first column in source and output data files is constrained to be Time, in order for the Real-Time-Ready Analyzer to transparently derive and maintain temporal information.

As illustrated by schema 530 of FIG. 5, for BT streams, the Real-Time-Ready Analyzer further uses StreamId to disambiguate between the various sources. Specifically, StreamId values of 0, 1, and 2 refer to ad impression, ad click, and keyword data (i.e., searches and pageviews), respectively. Further, based on StreamId, the column "KwAdId" refers to either a keyword or an AdId. More specifically, in a tested embodiment, each entry of the log data (i.e., element 105 or 110 of FIG. 1) is stored using a schema of Time-StreamID-UserID-KwAdID, as illustrated by element 530 of FIG. 5. Note that, this schema can be modified to include or remove other elements of interest, if desired. The important point is that, as noted above, source and output data files are constrained by Time to allow the Real-Time-Ready Analyzer to derive and maintain temporal information. In contrast, conventional schemas, such as schemas 500, 510, and 520, while making use of Time, generally constrain source and output files as a function of UserID, as illustrated by FIG. 5.

Figure 6:
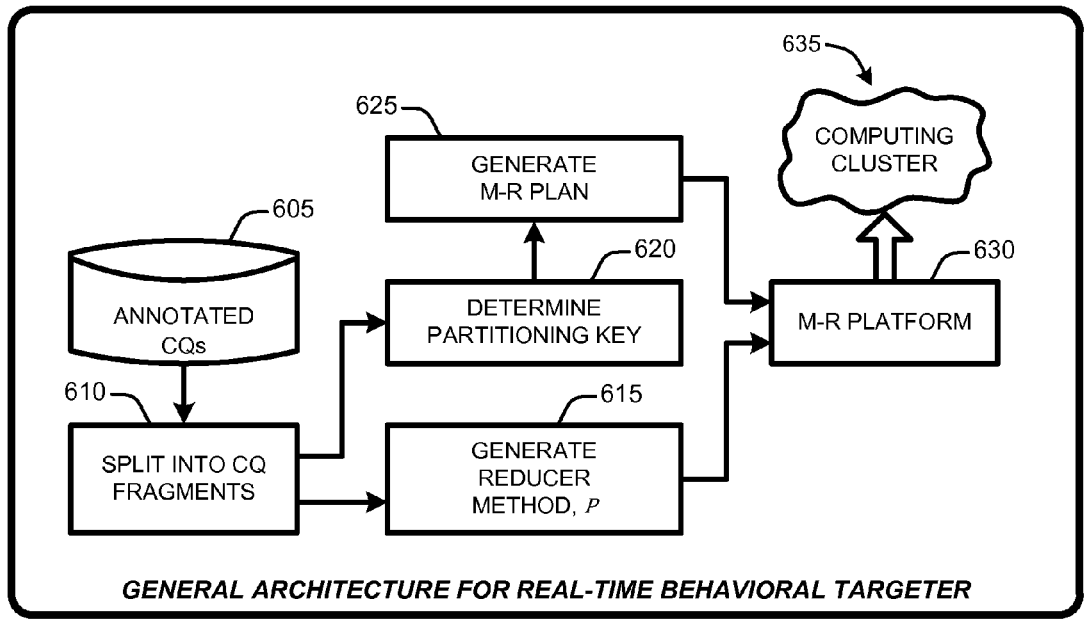
FIG. 6 illustrates a high-level view of the general architecture of the Real-Time-Ready Analyzer, as described herein.

2.2.2 Architectural Overview of the Real-Time-Ready Analyzer:

In general, as illustrated by FIG. 6, users write temporal queries (i.e., annotated CQs 605) in the DSMS language, and submit them to the Real-Time-Ready Analyzer. The Real-Time-Ready Analyzer first splits 610 these temporal queries into CQ fragments which are then evaluated to determine 620 a partitioning key for use in parallelizing the processing of each query fragment. Predefined rules are used to determine 620 the partitioning key, e.g., grouping key of GroupApply and equality predicate of equi-join. The partitioning key can also be explicitly specified by the user with query annotations. Note that such key determination is known to those skilled in the art, and will not be described in further detail herein.

The Real-Time-Ready Analyzer then instructs M-R to partition (map) the dataset by this partitioning key. In other words, the Real-Time-Ready Analyzer next generates 625 an M-R plan. The M-R platform 630 then invokes a stand-alone reducer method P for each partition in parallel in the computing cluster 635.

In particular, the Real-Time-Ready Analyzer uses the original query to construct or generate 615 reducer method P. P reads rows of data from the partition (via M-R), and converts each row into an event using the predefined Time column. Specifically, it sets event lifetime to [Time, Time+δ) (i.e., a "point event" as discussed above) and the payload to the remaining columns. P then passes these events to the DSMS via a generated method P'. P' is an embedded method that can execute the original CQ with the DSMS server embedded in-process. The DSMS performs highly efficient in-memory event processing within P' and returns query result events to P, which converts the events back into rows that are finally passed back to M-R as the reducer output.

Note that If the user provides a sequence of streaming queries with subquery fragments partitioning the data by different keys, they are converted into multiple M-R stages.

In the aforementioned running example (RunningClickCount), the CQ is written in LINQ as follows (note that this CQ plan is the same as CQ plan 400 in FIG. 4:

```
var clickCount = from e in inputStream
    where e.StreamId == 1 // clickstream
    group e by e.AdId into group
    from w in group.SlidingWindow(TimeSpan.FromHours(6))
    select new Output { ClickCount = w.Count( ), . . . } ;
```

RunningClickCount can be partitioned by AdId; hence, the Real-Time-Ready Analyzer sets the partitioning key to AdId, and generates a stand-alone reducer P that reads all rows (for a particular AdId), converts them into events, and processes the events with the above CQ, using the embedded DSMS. Result events are converted back into rows by the Real-Time-Ready Analyzer and returned to M-R as reducer output.

Discussion: It is important to note that neither M-R nor the DSMS are modified in order to implement the Real-Time-Ready Analyzer. In particular, the Real-Time-Ready Analyzer works independently and provides the plumbing to interface these systems for large-scale temporal analysis. From M-R's perspective, the method P is just another reducer, while the DSMS is unaware that it is being fed data from the file system via M-R.

One complication is that the map-reduce model expects results to be synchronously returned back from the reducer, whereas a DSMS pushes data asynchronously whenever new result rows get generated. The Real-Time-Ready Analyzer handles this inconsistency as follows: DSMS output is written to an in-memory blocking queue, from which P reads events synchronously and returns rows to M-R. Thus, M-R blocks waiting for new tuples from the reducer if it tries to read a result tuple before it is produced by the DSMS.

Another issue is that M-R invokes the reducer method P for each partition; thus, the Real-Time-Ready Analyzer instantiates a new DSMS instance (within P) for every AdId, which can be expensive. This is then addressed by setting the partitioning key to hash(AdId) instead of AdId, where hash returns a hash bucket in the range [1 . . . # machines], where "# machines" defines the total number of computers in the cluster. Since the CQ itself performs a GroupApply on AdId, output correctness is preserved.

Note that "application time" is used for temporal computations, i.e., the time is provided by the application (note that it is a part of the schema discussed above with respect to the composite schema illustrated in FIG. 5), and results are independent of when tuples physically arrive at the DSMS. Thus, query output is identical regardless of whether it is run on offline or real-time data. If it desired to perform a one-time data analysis (instead of time-based computation) on the historic data, it is easily achieved using the Real-Time-Ready Analyzer by setting the aforementioned hopping window width to cover the entire dataset to be analyzed.

The Real-Time-Ready Analyzer is used actively with Dryad and Stream Insight, to execute large-scale queries over advertising data. Again, as noted above, Stream Insight and Dryad are conventional examples of DSMS and map-reduce, respectively. However, it should be understood that the concepts described herein are directly applicable to other DSMS and map-reduce products and techniques. The Real-Time-Ready Analyzer has been observed to be both scalable and easy-to-use for parallel temporal computations.

2.3 BT Algorithms with the Real-Time-Ready Analyzer:

Given the above-described framework, the following discussion introduces various novel BT techniques, and explains how the Real-Time-Ready Analyzer is used to implement these techniques quickly and efficiently. In particular, recall that BT uses information collected about users' online behavior (such as Web searches and pages visited) in order to select which ad (or other URL) should be displayed to that user. The usual goal of BT is to improve the CTR by showing the most relevant ad to each user based on an analysis of historical behavior. Interestingly, BT techniques can be generally applied to traditional display advertising, and can also be used as supplementary input to content matching, sponsored search, etc.

2.3.1 BT Algorithm Overview:

Observed user behavior indicators such as search keywords, URLs visited, etc. are referred to herein as "features". Consequently, for simplicity, the terms "feature" and "keyword" are used interchangeably throughout the following discussion. Next, the concept of user behavior profile (UBP) is formally defined, where the UBP generally represents user behavior in the conventional and well-known "Bag of Words" model, where each word is a feature. Note that the Bag of Words model is a simplifying assumption used in natural language processing and information retrieval wherein text (such as a sentence or a query string) is represented as an unordered collection of words, disregarding both grammar and word order.

Definition of Ideal UBP: The ideal user behavior profile (UBP) for each user $U_i$ at time t and over a historical time window parameter of $\tau$ (time units), is a real-valued array $\overline{U}_i^t = \langle U_{i,1}^t, \ldots \rangle$ with one dimension for each feature (such as search keyword or URL, for example). The value $U_{i,j}^t$ represents a weight assigned to dimension j for user $U_i$, as computed using their behavior over the time interval [t−τ, t).

The value assigned to $U_{i,j}^t$ is generally the number of times that user $U_i$ searched for term j (or visited the webpage, if j is a URL) in the basic time interval [t−τ, t). Variations of this concept include giving greater importance to more recent activities by using a weighting factor as part of the weight computation. For each ad, prior behavior data $\mathcal{D}$ is provided. This prior behavior data $\mathcal{D}$ consists of n observations, $\mathcal{D} = \{(\overline{x}_1, y_1), \ldots (\overline{x}_n, y_n)\}$. Each observation for user $U_i$ at time t corresponds to an ad impression, and consists of a UBP $\overline{x} = \overline{U}_i^t$ and an outcome y which is either "1" (ad clicked) or "0" (ad not clicked).

Note that in the BT approach described herein, ad click likelihood depends only on the UBP at the time of the ad presentation. Based on this condition, the Real-Time-Ready Analyzer accurately estimates (for each ad) the expected CTR given a UBP $\overline{U}_i^{t'}$ at any future time t'.

Practical Restrictions: In most commercial platforms, the ideal UBPs are prohibitively large, generally including billions of users and millions of keywords and/or URLs. Thus, effective feature selection techniques are needed to make subsequent CTR estimation tractable and accurate.

In the case of parameter τ, some commercial systems consider relatively long-term user behavior (e.g., days, weeks, or even months), while others prefer short-term behavior (e.g., less than a day). Recent research over real data has indicated that short-term BT can significantly outperform long-term BT. Based on this finding, the Real-Time-Ready Analyzer uses τ=6 hours in a tested embodiment. However, it should be understood that the total period over which behavior is being evaluated, i.e., parameter τ, can be set to any desired value without departing from the intended scope of the Real-Time-Ready Analyzer, as described herein.

Note that given the very large, and quickly growing, number of ads, it is not generally considered practical to build an estimator for every ad in the system, though this can be done if desired. Instead, in various embodiments, the Real-Time-Ready Analyzer groups ads into ad classes, with one estimator then being built for each ad class. A naive solution to this grouping is to group ads manually (e.g., "consumer electronics", "games", etc.). A better alternative is to derive data-driven ad classes, by grouping ads based on the similarity of users who click (or reject) a particular ad. In any case, grouping of ads into classes is a concept that is known to those skilled in the art, and will not be described in detail herein. Further, note that the remainder of the discussion regarding "ads" will generally refer to "ad classes" whether or not such classes are explicitly mentioned.

2.3.2 System Architecture for BT:

The following discussion presents dual-intent algorithms for each BT step, starting with data having a schema such as the composite schema 530 illustrated in FIG. 5. The data is either stored in a distributed file system of some type, or it arrives as a real-time stream representing thousands, millions, or even billions of users.

Figure 7:
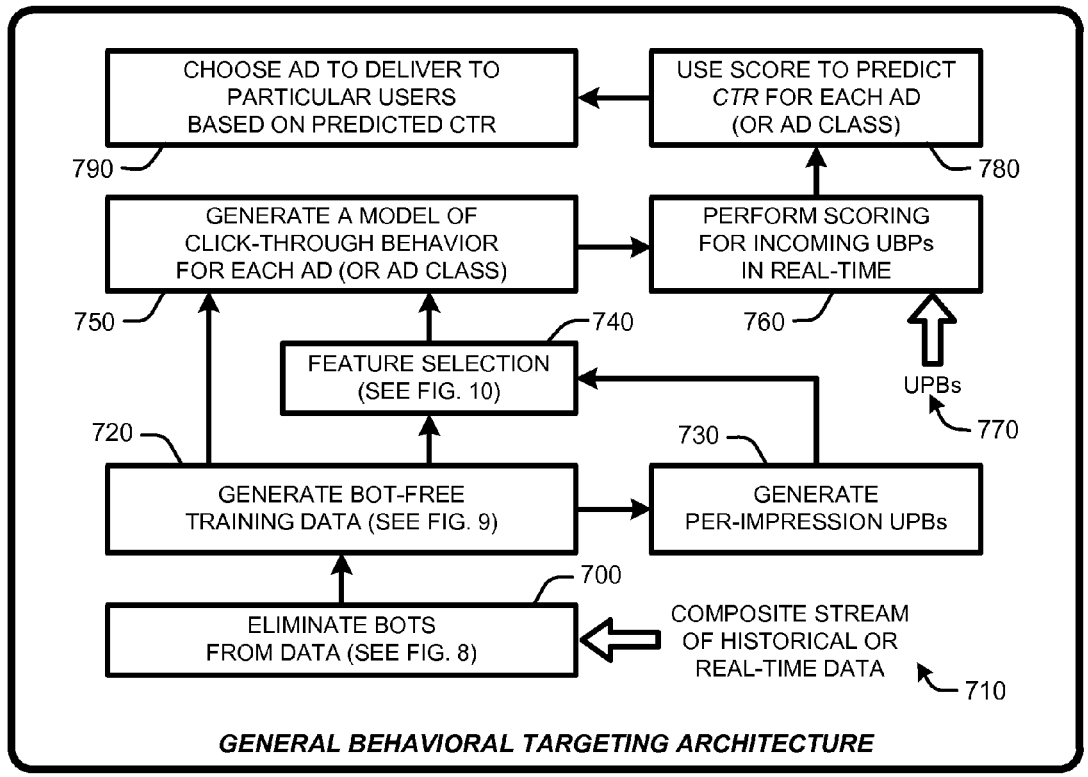
FIG. 7 illustrates a high-level view of the general behavioral-targeting (BT) architecture used by the Real-Time-Ready Analyzer, as described herein.

FIG. 7 shows a high-level view of the BT architecture developed for use by the Real-Time-Ready Analyzer. In general, this architecture first eliminates bots 700 from the composite stream of historical or real-time data 710 (e.g., the historical session data, element 105 of FIG. 1). The resulting bot free training data 720 is then is used to generate 730 per-impression UBPs. These UBPs 730 and the bot-free training data 720 are then used to perform feature selection 740 to produce reduced training examples. These reduced training examples are then fed to a model builder that generates 750 a model for click-through behavior for each ad (or ad class, as noted above). The resulting models are then used to score 760 incoming UBPs 770 in real-time. These scores are then used to predict 780 the CTR for each ad (or ad class), thereby enabling an appropriate ad to be chosen 790 and delivered to the user in real-time.

2.3.2.1 Bot Elimination:

As noted above, the Real-Time-Ready Analyzer first eliminates "users" that have "unusual" behavior characteristics corresponding to "bots". More specifically, a "bot" is defined as a user who either clicks on more than $T_1$ ads, or searches for more than $T_2$ keywords within a time window $\tau$. It is important to detect bots and eliminate them quickly as user activity information is being received.

Figure 8:
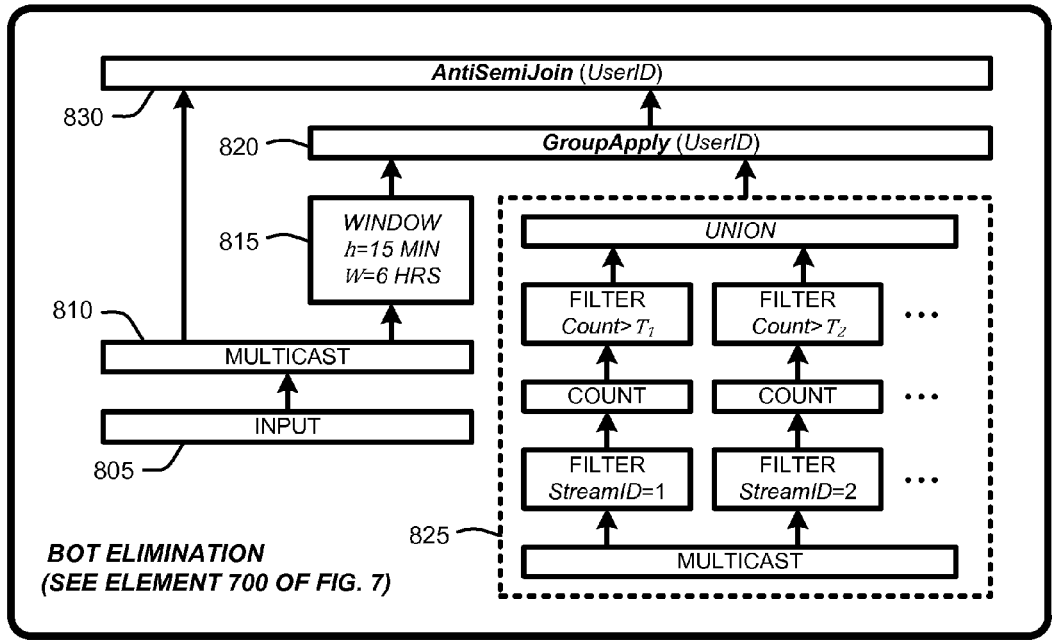
FIG. 8 illustrates a high-level view of the bot elimination architecture used by the Real-Time-Ready Analyzer, as described herein.

Implementation of Bot Elimination: Bot detection is partitionable by UserId. Thus, the DSMS plan shown in FIG. 8 can be used by the Real-Time-Ready Analyzer to eliminate bots (and their associated data) in the incoming data. The bot detection query (referred to herein as "BotElim") is implemented as follows: First, the "Window" operator 815 (as discussed above in Section 2.1.1.2) with hop size h=15 minutes and window w=6 hours is applied to the original composite input source $S_1$ 805 (which is a point event stream). This input source $S_1$ 805 is multicast 810 to the Window operator 815, and to an AntiSemiJoin operator 830 (discussed further below). Note that element 805 of FIG. 8 is the same input source as element 710 of FIG. 7. The aforementioned Window parameters ensure that the bot list is updated every 15 minutes using data from a 6-hour window. Again, as noted above, both the hop size and window size can be set to any desired length of time.

Next, the GroupApply operator 820 (with grouping key UserId) applies the following sub-query 825 to each unique UserId sub-stream: From the input stream for that user, the Real-Time-Ready Analyzer extracts the click and keyword data separately (by filtering on StreamId), performs the Count operation on each stream, filters out counter events with value less than the appropriate threshold ($T_1$ or $T_2$), and finally, performs a union to get a single stream $S_2$ that contains tuples only when that user is a bot. Note that any other desired filters or criteria (not shown) can also be added to sub-query 825 for improving bot determination.

Finally, the Real-Time-Ready Analyzer performs an Anti-SemiJoin (see element 830) (on UserId) of the original point event stream $S_1$ (element 805) with $S_2$ (i.e., the output from element 820) to output data for any user that is not a bot. The Real-Time-Ready Analyzer uses UserId as the partitioning key for this query. Note that the query plan illustrated by FIG. 8 can be implemented with about 6 lines of LINQ, and is highly efficient.

2.3.2.2 Generating Training Data:

This component, referred to herein as "GenTrainData" (illustrated by the CQ of FIG. 9, as discussed in further detail below), is used for feature selection, model building, and scoring, as discussed in further detail below. The purpose is to generate training data of positive and negative examples in the form ⟨UBP, outcome⟩. Here, an outcome of "1" indicates ad click, "0" indicates no ad click (i.e., "StreamID=1" and "StreamID=0" for click and non-click, respectively), and UBP is defined at the time of the ad impression.

The Real-Time-Ready Analyzer first detects non-clicks (ad impressions that do not result in a click) by eliminating impressions that are followed by a click (by the same user) within a small time d (note that clicks are directly available as input). The Real-Time-Ready Analyzer also maintains the per-user UBPs based on user searches/pageviews (note that such data is routinely recorded by numerous conventional ad servers and the like). Finally, whenever there is a click/non-click activity for a user, a training example is generated by joining the activity with that user's UBP.

Figure 9:
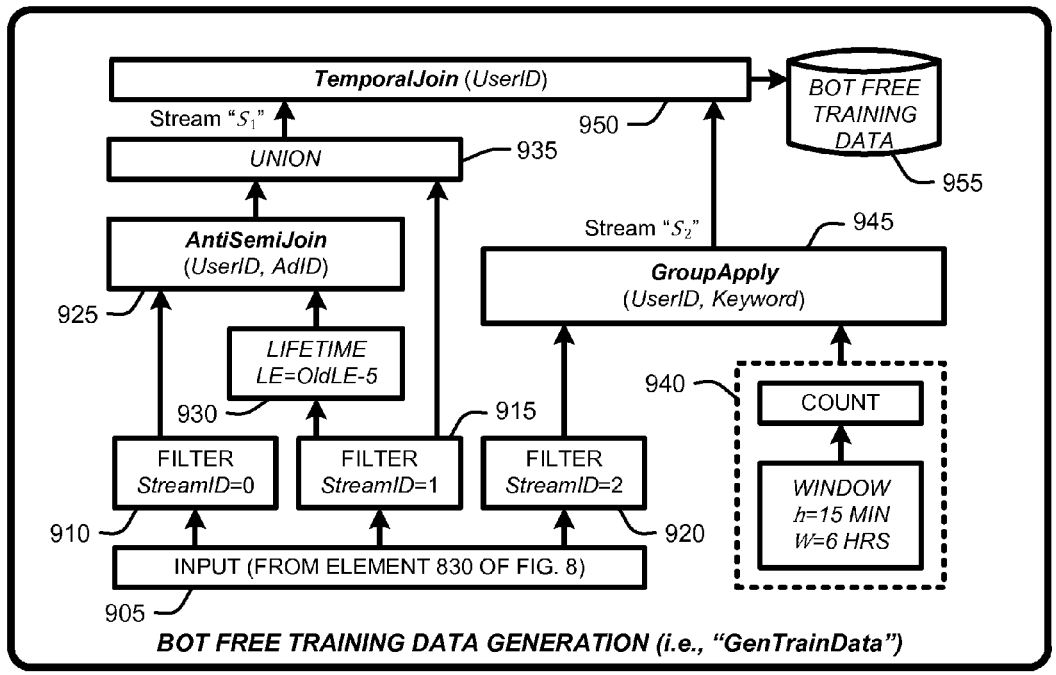
FIG. 9 illustrates a high-level view of the general bot free training data generation architecture used by the Real-Time-Ready Analyzer, as described herein.

Implementation of Training Data Generation: As illustrated by FIG. 9, the Real-Time-Ready Analyzer first eliminates impressions from the input data 905 that resulted in a click, by performing an AntiSemiJoin 925 an Union 935 of impression point events (see elements 910 and 915) with click data whose LE (see section 2.1.1.1) is moved d=5 minutes into the past (see element 930). The resulting composite stream of clicks and non-clicks is referred to herein as stream "$S_1$".

Further, the Real-Time-Ready Analyzer extracts a keyword stream from the input data 905 (by filtering 920 on StreamId), and performs a GroupApply 945 by {UserId, Keyword}. For each substream, the Real-Time-Ready Analyzer applies a Window (w=τ) followed by Count (i.e., sub-plan 940), to produce a stream "$S_2$" of {UserId, Keyword, Count}, where Count is the number of times Keyword was used by UserId in the last 6 hours (i.e., Window is set to 6 hours in this example). Note that this is exactly the UBPs (in sparse representation) refreshed each time there is user activity. Finally, the Real-Time-Ready Analyzer performs a TemporalJoin 950 (on UserId) between stream $S_1$ and stream $S_2$ to produce an output that contains, for each click and non-click, the associated UBP in sparse representation, i.e., the bot-free training data 955.

Further, GenTrainData scales well since the Real-Time-Ready Analyzer uses UserId as the partitioning key. It may appear that partitioning could instead have been by {UserId, Keyword} for generating UBPs, but this is not of particular use since: (1) there is already a large number of users for effective parallelization; and (2) it is necessary to partition by UserId alone for the subsequent TemporalJoin anyway.

2.3.2.3 Feature Selection:

In the training data of (UBP, outcome), the ideal UBPs are generally considered to have prohibitively large dimensionality. Consequently, it is useful to reduce the data for computational feasibility and accuracy of model generation (since a large amount of training data is required for directly building models in a high-dimensional space, which is impractical). Feature selection is particularly important in real-time, since it makes subsequent processing steps computationally feasible.

Conventional data reduction schemes do not scale well for BT, particularly in the real-time case; hence, several techniques have been proposed in recent years. For example, one such scheme retains only the most popular keywords. However, this may retain some common search keywords (e.g., "facebook", "craigslist", etc.) that may not be good predictors for ad click or non-click. Another conventional alternative is to map keywords into a smaller domain of categories in a concept hierarchy such as ODP (e.g., electronics, fitness, etc.). However, this technique cannot adapt to new keywords and dynamic variations in user interests. Further, the human element in the loop (used for concept hierarchy construction) introduces delays and inaccuracies.

Consequently, the Real-Time-Ready Analyzer provides a new "keyword elimination" process (i.e., "feature selection") based on the concept of support-based statistical hypothesis testing. The basic intuition is that it is desirable to retain any keyword that can be determined with some confidence to be positively (or negatively) correlated with ad clicks, based on the relative frequency of clicks with that keyword in the UBP (compared to clicks without that keyword in the UBP).

In particular, the Real-Time-Ready Analyzer first eliminates keywords that do not have sufficient support, i.e., there are not enough examples of ad clicks with that keyword in the search history. This is acceptable because such keywords do not have sufficient information to help CTR estimation anyway. In a tested embodiment, "sufficient support" was identified as having five or more clicks. However, the number of clicks required to indicate sufficient support can be set to any desired value.

Next, the Real-Time-Ready Analyzer uses an unpooled two-proportion z-test to derive a score for each keyword that is representative of the relevance of that keyword to the ad. However, it should be understood that other statistical scoring techniques can also be used here, and that the Real-Time-Ready Analyzer is not intended to be limited use of a z-test.

In any case, assuming the use of a z-test for purposes of explanation, highly positive (or negative) scores indicate a positive (or negative) correlation to ad clicks. A threshold is then placed on the absolute score to retain only those keywords that are relevant to the ad in a positive or negative manner. In a tested embodiment, z was varied from from 0 to about 5.12. Note that z=0 corresponds to retaining all keywords with sufficient support (i.e., at least 5 clicks exist with that keyword, across the UBPs of all users). Note that both the threshold z, and the number of clicks required to indicate sufficient support (5 in this example), can be increased or decreased, as desired.

Specifically, let $C_K$ and $I_K$ denote the number of clicks and impressions respectively, for a particular ad and with keyword K in the user's UBP at the time of impression occurrence. Further, let $C_{\bar{K}}$ and $I_{\bar{K}}$ denote total clicks and impressions respectively for the ad, without keyword K. Then, the probability of clicking with keyword $p_K = C_K/I_K$, and the probability of clicking without keyword $p_{\bar{K}} = C_{\bar{K}}/I_{\bar{K}}$. The null hypothesis is {$H_0$: keyword K is independent of clicks on the ad}. The z-score for this hypothesis can be computed as illustrated by Equation (1), where:

$$z = \frac{p_K - p_{\bar{K}}}{\sqrt{\frac{p_K(1-p_K)}{I_K} + \frac{p_{\bar{K}}(1-p_{\bar{K}})}{I_{\bar{K}}}}} \quad \text{Equation (1)}$$

given that there are at least 5 independent observations of clicks and impressions with and without keyword K. The z-score follows the N(0,1) Gaussian distribution if $H_0$ holds. Hence, at 95% confidence level, if $|z|>1.96$, hypothesis $H_0$ will be rejected, and thus keyword K will be retained. Therefore, by setting an appropriate threshold for $|z|$, the Real-Time-Ready Analyzer can perform effective data-driven keyword elimination.

Note that in various embodiments, once the feature reduction process described above has been completed, a further dimensionality reduction is accomplished (see discussion of "dimensionality reduction module" 125 in FIG. 1, above). In particular, as noted above, some conventional schemes reduce the total number of keywords by mapping keywords to a smaller set of concepts. This basic idea can also be applied to the reduced set of keywords generated using the new support-based statistical hypothesis testing described above. In other words, a further dimensionality reduction of the reduced feature set is accomplished by applying an additional optional step of applying a conventional real-time clustering process to the reduced feature set, with the resulting features clusters then being treated as individual "features" for purposes of further evaluation. The result is the computational overhead is further reduced since there are generally significantly fewer feature clusters than there are total features in the reduced feature set (see discussion of "feature reduction module" 120 in FIG. 1, above).

Figure 10:
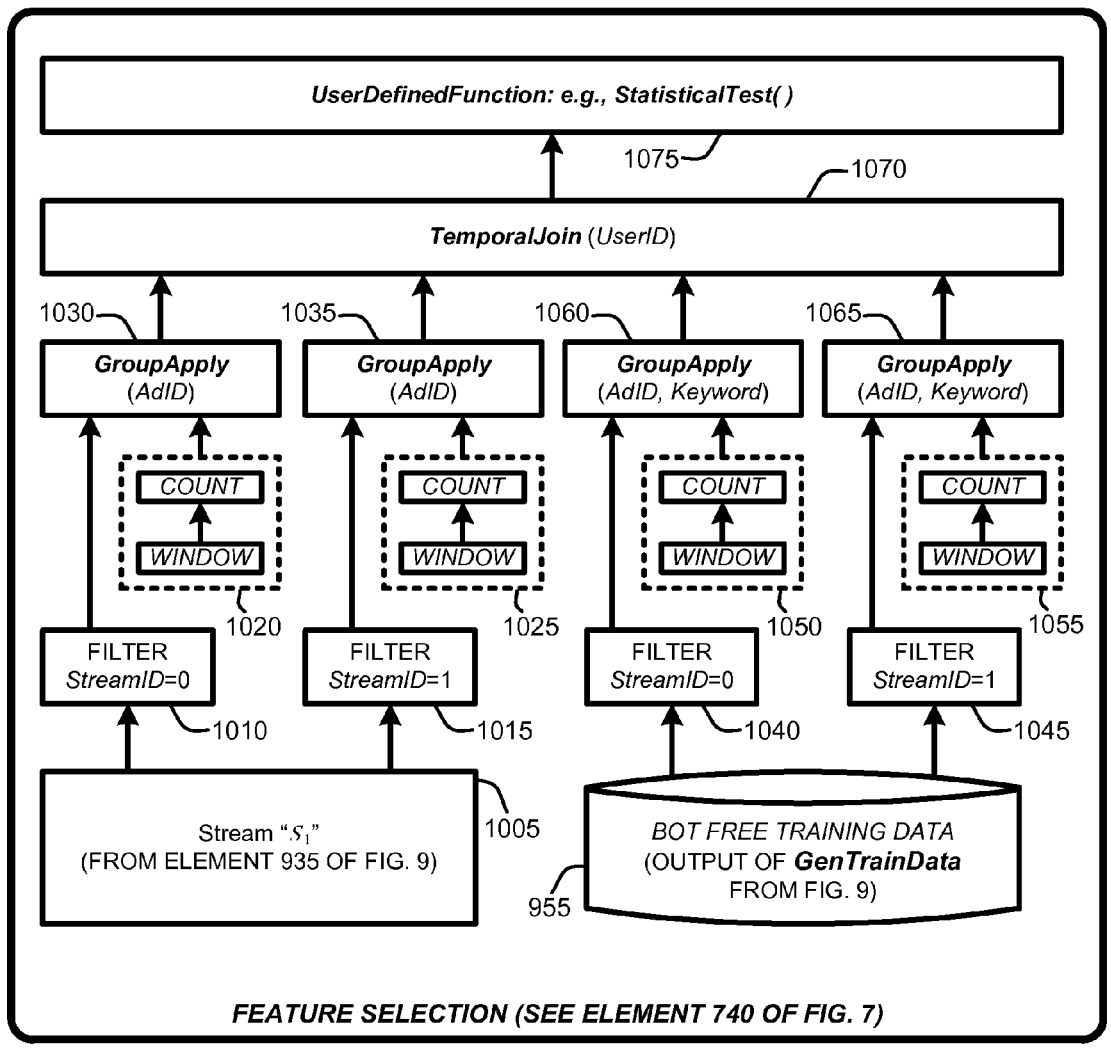
FIG. 10 illustrates a high-level view of the general feature selection architecture used by the Real-Time-Ready Analyzer, as described herein.

Implementation of Feature Selection: As shown in FIG. 10, the Real-Time-Ready Analyzer firsts computes the total number of non-clicks and clicks in stream $S_1$ 1005 using GroupApply (1035 for clicks and 1030 for non-clicks) (by AdId), followed by Count with h covering the time interval over which keyword elimination is being performed on the filtered data (1015 for clicks and 1010 for non-clicks). This sub-query (called TotalCount—element 1025 for clicks and 1020 for non-clicks) is partitioned by AdId. Next, the Real-Time-Ready Analyzer processes the bot-free training data 955 output of GenTrainData (see Section 2.3.2.2, see also FIG. 9) to compute the number of clicks and non-clicks in the filtered data (1045 for clicks and 1040 for non-clicks) with each keyword K similarly (via GroupApply—element 1065 for clicks and 160 for non-clicks). In this sub-query (called PerKWCount—1055 for clicks and 1060 for non-clicks), the partitioning key is {AdId, Keyword}.

These two processed streams are then joined (via TemporalJoin 1070) to produce a stream with one tuple for each {AdId, Keyword} pair, that contains all the information to compute the z-test. The Real-Time-Ready Analyzer computes the z-score (or other user defined statistical test 1075) using a UDO (i.e., a user defined operator, as discussed above in Section 2.1.1.2), and a filter eliminates keywords whose z-scores fall below a specified threshold. This sub-query, called "CalcScore" (not shown) uses {AdId, Keyword} as the partitioning key. Finally, the Real-Time-Ready Analyzer performs a TemporalJoin (not shown) of the original training data with the reduced keyword stream to produce the reduced training data.

Improving Memory Scalability via Keyword Elimination: The training data is maintained in-memory (within the TemporalJoin synopses) in sparse representation for keyword elimination. For each keyword, the memory usage is proportional to the number of impressions with that keyword in their search history. Since this could be large for common keywords, the overall memory usage can be high even after the scale-out provided by the keyword elimination process described above.

Therefore, the Real-Time-Ready Analyzer optionally addresses this problem in various embodiments by expanding the keyword elimination process described above to a two-phase process. In particular, the improved keyword elimination process begins by first performing hypothesis testing on a relatively small sample of users (rather than over all users across the entire set of historical session data). This has been observed to provide acceptable results for eliminating useless common keywords (which are the highest memory utilizers). The most common keywords will have sufficient support in even a relatively small set of users to perform the statistical testing that allows those keywords to be eliminated in this first phase. The resulting reduced input stream is then used to perform the previously described steps as a second phase of keyword elimination.

2.3.2.4 Model Generation and Scoring:

The Real-Time-Ready Analyzer is given prior observations (UBP=$\overline{x}$, outcome=y) corresponding to ad impressions that serve as feedback about whether or not a particular UBP indicates interest in the ad. Based on this feedback, the Real-Time-Ready Analyzer acts to detect the underlying relationship between UBPs and ad click likelihood. The Real-Time-Ready Analyzer uses the observations to fit a logistic regression (LR) model, such as $y=g(w_0+\overline{w}^T\overline{x})$, where $\overline{w}$ is called the weight vector and g is the logistic function. One challenge with using a learner is that the input data is highly skewed with mostly negative examples (CTRs are typically lower than 1%). Hence, the Real-Time-Ready Analyzer first creates a balanced dataset by sampling the negative examples and repeating the positive examples.

Note that LR is used here for purposes of explanation because of its simplicity, good performance, and fast convergence, which make it appropriate for quick recomputation and adjustment in real-time. However, there are quite a few machine-learning approaches that can be used in the context of the above-described learning problem in place of LR. Examples of such approaches include, for example, Logistic Regression, Support Vector Machines, Decision Trees, Nearest Neighbor and k-Nearest Neighbor Classifiers, Neural Networks, etc.

In any case, the output of this learning step (LR in this example) is a weight vector, which is used to score users. One challenge here is that the LR prediction, y, is not the expected CTR, whereas the Real-Time-Ready Analyzer needs CTR to compare predictions across ads. However, it is important to understand that the Real-Time-Ready Analyzer can estimate the CTR for a given prediction y. In particular, CTR estimation from the LR prediction, y, is accomplished as follows:
  a. Compute predictions for a validation dataset (not used in learning);
  b. Choose the k nearest validation examples with predictions closest to y; and
  c. Estimate CTR for prediction y as the average CTR within the k examples.

The Real-Time-Ready Analyzer can then choose an ad to deliver to the end user based on the estimated CTR and other factors. For example, once a CTR has been estimated for any ad, that CTR information can be used in a conventional ad auction wherein ads are selected and provided as an impression to the user. More specifically, in a typical ad auction, one or more of the highest bidding ads (generally those having the highest CTR for the current user) are placed in the highest positions in an ad panel or the like presented to the user in a typical query results page that is provided to the user in response to a user entered query term or keyword.

Note that the bot detection, training data generation, feature selection, and scoring algorithms described above are fully incremental. The framework allows an incremental LR algorithm to be plugged in, but given the speed of LR convergence, it has been observed that periodic re-computation of the LR model works sufficiently well for BT purposes.

Implementation of Model Generation and Scoring: As noted above, the input is a stream of 〈UBP, outcome〉 examples. The Real-Time-Ready Analyzer uses a UDO (i.e., a user defined operator, as discussed above in Section 2.1.1.2) with Window to perform in-memory LR on this data (again, other machine-learning techniques can be used, if desired). The hop size determines the frequency of performing LR, while the window size determines the amount of training data used for the learning. The output model weights are lodged in the right synopsis of a TemporalJoin operator (for scoring), which produces an output prediction whenever a new user UBP is fed on its left input.

Figure 11:
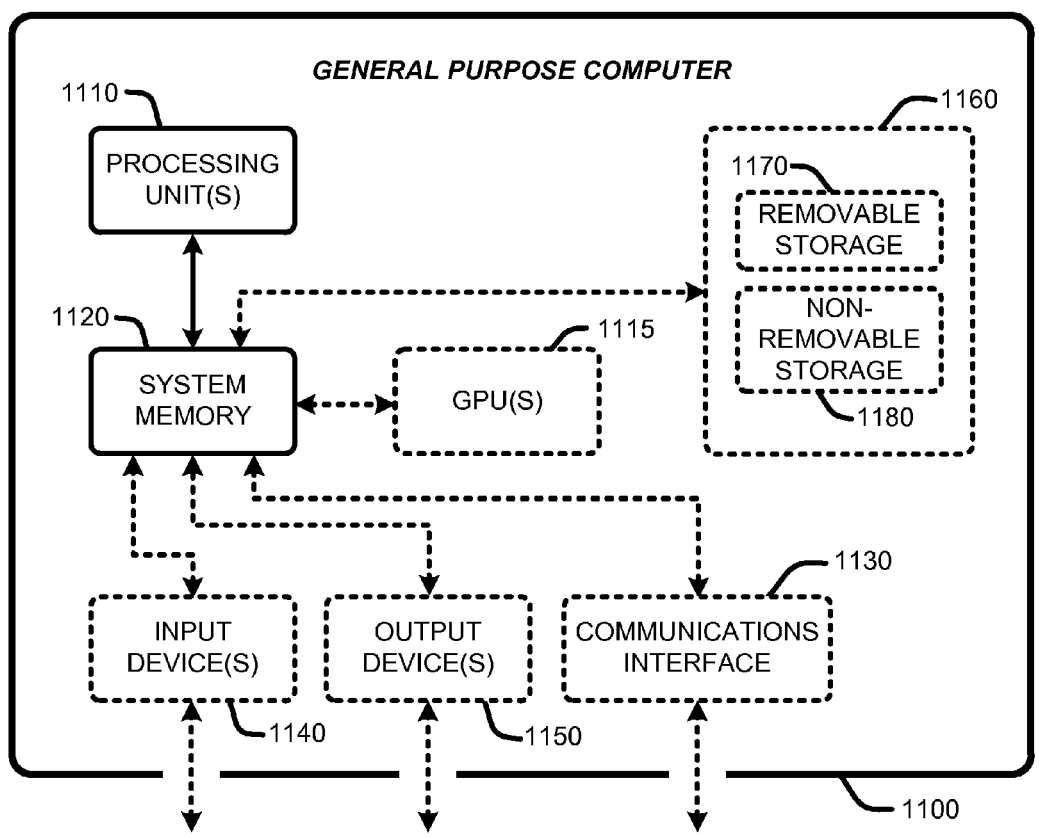
FIG. 11 is a general system diagram depicting a simplified general-purpose computing device having simplified computing and I/O capabilities for use in implementing various embodiments of the Real-Time-Ready Analyzer, as described herein.

3.0 Exemplary Operating Environments:

The Real-Time-Ready Analyzer described herein is operational within numerous types of general purpose or special purpose computing system environments or configurations. FIG. 11 illustrates a simplified example of a general-purpose computer system on which various embodiments and elements of the Real-Time-Ready Analyzer, as described herein, may be implemented. It should be noted that any boxes that are represented by broken or dashed lines in FIG. 11 represent alternate embodiments of the simplified computing device, and that any or all of these alternate embodiments, as described below, may be used in combination with other alternate embodiments that are described throughout this document.

For example, FIG. 11 shows a general system diagram showing a simplified computing device 1100. Such computing devices can be typically be found in devices having at least some minimum computational capability, including, but not limited to, personal computers, server computers, hand-held computing devices, laptop or mobile computers, communications devices such as cell phones and PDA's, multi-processor systems, microprocessor-based systems, set top boxes, programmable consumer electronics, network PCs, minicomputers, mainframe computers, video media players, etc.

To allow a device to implement the Real-Time-Ready Analyzer, the device should have a sufficient computational capability and system memory. In particular, as illustrated by FIG. 11, the computational capability is generally illustrated by one or more processing unit(s) 1110, and may also include one or more GPUs 1115, either or both in communication with system memory 1120. Note that that the processing unit(s) 1110 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 11 may also include other components, such as, for example, a communications interface 1130. The simplified computing device of FIG. 11 may also include one or more conventional computer input devices 1140. The simplified computing device of FIG. 11 may also include other optional components, such as, for example, one or more conventional computer output devices 1150. Finally, the simplified computing device of FIG. 11 may also include storage 1160 that is either removable 1170 and/or non-removable 1180. Such storage devices includes computer readable media including, but not limited to, DVD's, CD's, floppy disks, tape drives, hard drives, optical drives, solid state memory devices, etc. Further, software embodying some or all of the various embodiments, or portions thereof, may be stored on any desired combination of computer readable media in the form of computer executable instructions, software programs, program modules, hardware devices, etc. Note that typical communications interfaces 1130, input devices 1140, output devices 1150, and storage devices 1160 for general-purpose computers are well known to those skilled in the art, and will not be described in detail herein.

The foregoing description of the Real-Time-Ready Analyzer has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Real-Time-Ready Analyzer. It is intended that the scope of the invention be limited not by this detailed description, but rather by the claims appended hereto.

What is claimed is:

1. A method for real-time estimation of user-specific click through rates (CTR) for ads, comprising using a computer to perform process actions for:
   receiving one or more sets of historical session data derived from one or more groups of users, said historical session data comprising time-stamped click and impression data for a plurality of ads in combination with user-specific features, said features including any of pageviews, URLs and keywords;
   processing the historical session data to eliminate any data corresponding to users identified as bots to generate a set of bot-free session data;
   processing the bot-free session data to generate a user behavior profile (UBP) for each user in the bot-free session data;
   processing the bot-free session data to eliminate statistically insignificant features by performing a statistical hypothesis test that retains only features having a number of associated clicks exceeding a specified minimum click level, and from the retained features, eliminating any features having a statistical association of positive or negative click events that is below a minimum statistical threshold, thereby creating a reduced feature set from the bot-free session data;
   generating a model of click-through behavior for each ad in the bot-free data for each UBP;
   for new user session data received in real-time, computing a score for each feature/ad pair based on the bot-free data and the reduced feature set for each new user based on the model of click-through behavior for each ad;
   estimating a CTR for each ad from the computed score for each ad; and
   serving one or more ads in real-time to each new user based on the estimated CTR for each ad for each new user.

2. The method of claim 1 wherein predicting the CTR for each ad further comprises:
   choosing a predetermined number of examples of feature/ad pairs having scores closest to a current ad score; and
   estimating the CTR for the current ad score as an average CTR within the selected examples.

3. The method of claim 2 further comprising an automated online ad auction, and wherein ads are automatically selected for specific positions in an ad panel presented to the user in a query results page provided in response to a user-entered keyword.

4. The method of claim 1 wherein computing a score for each feature/ad pair based on the bot-free data and the reduced feature set for each new user based on the model of click-through behavior for each ad comprises:
   specifying a continuous query (CQ) for estimating the CTR, said CQ to be run in a Map-Reduce (M-R) application;
   determining a partitioning key for the CQ from the bot-free session data for use in partitioning the bot-free session data, and distributing the partitioned data sets to a cluster comprising a plurality of computing devices in a map phase of the M-R application;
   instantiating an embedded data stream management system (DSMS) having one or more DSMS-based algorithms for performing temporal analysis of data sets partitioned in the map phase of the M-R framework, said DSMS algorithms operating on the plurality of computing devices to output one or more events from the temporal analysis of the partitioned data;
   wherein output of the DSMS-based algorithms is written to an in-memory blocking queue, from which a reducer phase of the M-R application reads events synchronously relative to the time-stamp associated with each event, regardless of a DSMS output order for the events; and
   wherein the reducer phase of the M-R framework completes the CQ of the partitioned data by processing the events that are synchronously read from the blocking queue by performing the same computation on each data partition in parallel each of the computing devices to compute the score for each ad.

5. A system for running temporal queries over large sets of data stored in a distributed file system, comprising:
   a device for receiving one or more data sets stored in a distributed file system, said data sets comprising a plurality of time-stamped events;
   a device for specifying one or more temporal queries to be run in a Map-Reduce (M-R) application;
   a device for splitting the temporal queries into a set of continuous query (CQ) fragments which are then evaluated to determine a partitioning key;
   a device for using the partitioning key for partitioning and distributing the data sets to a cluster comprising a plurality of computing devices in a map phase of the M-R application;
   an embedded data stream management system (DSMS) having one or more DSMS-based algorithms for executing a corresponding CQ fragment on a corresponding one of the partitioned data sets, said DSMS algorithms operating on the plurality of computing devices to output one or more events from execution of the CQ fragments on the partitioned data;
   wherein output of the DSMS-based algorithms is written to an in-memory blocking queue, from which a reducer phase of the M-R application reads events synchronously relative to the time-stamp associated with each event, regardless of a DSMS output order for the events;
   wherein the reducer phase of the M-R framework completes the CQ of the partitioned data by processing the events that are synchronously read from the blocking queue by performing the same computation on each data partition in parallel each of the computing devices; and a device for outputting the results of the completed CQs to generate the results of the temporal queries.

6. The system of claim 5 wherein at least of one the data sets represents historical session data stored derived from a browsing history of one or more groups of users, said historical session data comprising time-stamped click and impression data for a plurality of ads in combination with user-specific features, said features including any of pageviews, URLs and keywords associated with the browsing history of each user.

7. The system of claim 6 wherein one or more of the temporal queries is designed to perform behavioral targeting (BT) of the users based on the historical session data to construct a user behavior profile (UBP) for each unique user.

8. The system of claim 7 wherein one or more of the temporal queries estimates a click-through rate (CTR) for feature/ad pairs for each UBP in the reduce phase of the M-R application, with the estimated CTRs being output as the results of the completed CQ.

9. The system of claim 8 wherein the estimated CTRs are used to estimate new ad CTRs for new users in real-time in response to real-time user browsing information, including time-stamped click and impression data for a plurality of ads in combination with user-specific features, said features including any of pageviews, URLs and keywords.

10. The system of claim 9 further comprising a device for serving one or more ads to one or more new users in real-time based on the estimated new ad CTRs for those users.

11. The system of claim 10 further comprising a device for an automated online ad auction, and wherein ads are automatically selected for specific positions based on bid levels for corresponding ads relative to the estimated CTRs.

12. The system of claim 6 further comprising a feature elimination process comprising:

a support-based statistical hypothesis test that retains only features having a number of associated clicks exceeding a specified minimum click level; and wherein of the retained features, any features having a statistical correlation of positive or negative click events that is below a minimum statistical threshold are eliminated, thereby creating a reduced feature set comprising any remaining features.

13. The system of claim 12 wherein one or more of the temporal queries is designed to perform behavioral targeting (BT) of the users based on the reduced feature to construct a user behavior profile (UBP) for each unique user.

14. The system of claim 6 further comprising processing the historical session data to eliminate any data corresponding to users identified as bots.

15. A computer-readable medium having computer executable instructions stored therein for running continuous queries over large sets of data stored in a distributed file system, said instructions comprising:

receiving one or more data sets stored in a distributed file system, said data sets comprising a plurality of time-stamped events;

processing the data sets to eliminate any data corresponding to users identified as bots;

specifying one or more temporal queries to be run in a Map-Reduce (M-R) application;

fragmenting the temporal queries into a set of continuous queries (CQ);

determining a partitioning key for each CQ from the data sets for use in partitioning the data sets and distributing the partitioned data sets to a cluster comprising a plurality of computing devices in a map phase of the M-R application;

instantiating an embedded data stream management system (DSMS) having one or more DSMS-based algorithms for performing temporal analysis of data sets partitioned in the map phase of the M-R framework, said DSMS algorithms operating on the plurality of computing devices to output one or more events from the temporal analysis of the partitioned data;

wherein output of the DSMS-based algorithms is written to an in-memory blocking queue, from which a reducer phase of the M-R application reads events synchronously relative to the time-stamp associated with each event, regardless of a DSMS output order for the events;

wherein the reducer phase of the M-R framework completes the CQ of the partitioned data by processing the events that are synchronously read from the blocking queue by performing the same computation on each data partition in parallel each of the computing devices; and outputting the results of the completed CQs to generate the results of the temporal queries.

16. The computer-readable medium of claim 15 wherein at least of one the data sets represents historical session data stored derived from a browsing history of one or more groups of users, said historical session data comprising time-stamped click and impression data for a plurality of ads in combination with user-specific features, said features including any of pageviews, URLs and keywords associated with the browsing history of each user.

17. The computer-readable medium of claim 16 wherein one or more of the temporal queries is designed to perform behavioral targeting (BT) of the users based on the historical session data to construct a user behavior profile (UBP) for each unique user.

18. The computer-readable medium of claim 17 wherein one or more of the temporal queries estimates a click-through rate (CTR) for feature/ad pairs for each UBP in the reduce phase of the M-R application, with the estimated CTRs being output as the results of the completed CQ.

19. The computer-readable medium of claim 18 wherein the estimated CTRs are used to estimate new ad CTRs for new users in real-time in response to real-time user browsing information, including time-stamped click and impression data for a plurality of ads in combination with user-specific features, said features including any of pageviews, URLs and keywords.

20. The computer-readable medium of claim 16 further comprising a feature elimination process, comprising:

a support-based statistical hypothesis test that retains only features having a number of associated clicks exceeding a specified minimum click level; and wherein of the retained features, any features having a statistical association of positive or negative click events that is below a minimum statistical threshold are eliminated, thereby creating a reduced feature set comprising any remaining features.

* * * * *